US011576124B2

(12) United States Patent
Xu

(10) Patent No.: US 11,576,124 B2
(45) Date of Patent: Feb. 7, 2023

(54) METHOD AND DEVICE FOR TRANSMITTING POWER SAVING SIGNAL

(71) Applicant: GUANGDONG OPPO MOBILE TELECOMMUNICATIONS CORP., LTD., Dongguan (CN)

(72) Inventor: Weijie Xu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 59 days.

(21) Appl. No.: 17/061,417

(22) Filed: Oct. 1, 2020

(65) Prior Publication Data

US 2021/0022075 A1 Jan. 21, 2021

Related U.S. Application Data

(63) Continuation of application No. PCT/CN2018/082715, filed on Apr. 11, 2018.

(51) Int. Cl.
*H04W 52/00* (2009.01)
*H04W 52/02* (2009.01)
(Continued)

(52) U.S. Cl.
CPC ..... *H04W 52/0229* (2013.01); *H04J 13/0062* (2013.01); *H04L 27/2607* (2013.01); (Continued)

(58) Field of Classification Search
CPC ........... H04W 52/0209; H04W 56/001; H04W 76/11; H04W 72/042
See application file for complete search history.

(56) References Cited

U.S. PATENT DOCUMENTS 9,872,252 B1 1/2018 Ang et al.
2016/0373237 A1* 12/2016 Shellhammer ........ H04L 7/0012
(Continued)

FOREIGN PATENT DOCUMENTS

CN 107431982 A 12/2017
CN WO2019192456 A1 * 10/2019 ............ H04W 72/04
(Continued)

OTHER PUBLICATIONS

3GPP TSG RAN WG2 Meeting # 101, R2-1803302, Feb. 26-Mar. 2, 2018.*
(Continued)

*Primary Examiner* — Abdelillah Elmejjarmi
(74) *Attorney, Agent, or Firm* — Morgan, Lewis & Bockius LLP

(57) ABSTRACT

Disclosed are a method and device for transmitting a power saving signal, the method includes: sending, by a network device, a power saving signal to a terminal device, wherein the power saving signal comprises a first sequence, the first sequence is used to indicate at least part of identification information related to the terminal device, and/or the first sequence is used for the terminal device to perform time-frequency synchronization; wherein the identification information related to the terminal device comprises: an identity of a device group which the terminal device belongs to, a device identity of the terminal device, and Physical Cell Identification (PCI) information of a cell where the terminal device resides.

23 Claims, 11 Drawing Sheets

100

120

110

120

(51) Int. Cl.
*H04W 76/11* (2018.01)
*H04J 13/00* (2011.01)
*H04L 27/26* (2006.01)
*H04W 56/00* (2009.01)
*H04W 72/04* (2009.01)

(52) U.S. Cl.
CPC ....... *H04W 56/001* (2013.01); *H04W 72/042* (2013.01); *H04W 72/0446* (2013.01); *H04W 72/0453* (2013.01); *H04W 72/0466* (2013.01); *H04W 76/11* (2018.02)

(56) References Cited

U.S. PATENT DOCUMENTS

| | | | | |
|---|---|---|---|---|
| 2018/0007734 | A1 | 1/2018 | Petteri et al. | |
| 2018/0234807 | A1* | 8/2018 | Park | H04W 4/06 |
| 2019/0090193 | A1* | 3/2019 | Liu | H04W 52/028 |
| 2020/0029302 | A1* | 1/2020 | Cox | H04W 52/0235 |
| 2020/0059862 | A1* | 2/2020 | Wong | H04W 56/001 |
| 2020/0367166 | A1* | 11/2020 | Wong | H04W 52/0229 |

FOREIGN PATENT DOCUMENTS

| | | | |
|---|---|---|---|
| EP | 3665882 | A1 | 6/2020 |
| EP | 3704899 | A1 | 9/2020 |
| EP | 3744129 | A1 | 12/2020 |
| WO | WO2019/030337 | A | 2/2019 |
| WO | WO2019/030337 | A | 4/2019 |

OTHER PUBLICATIONS

Guangdong OPPO Mobile Telecommunications Corp. Ltd., Extended European Search Report, EP18914282.1, dated Mar. 25, 2021, 19 pgs.
Huawei, HiSilicon, Feature lead summary on detailed design of Wake-up signal in NB-IoT, 3GPP TSG RAN WG1 Meeting #92, R1-1803006, Athens, Greece, Feb. 26-Mar. 2, 2018, 8 pgs.
Intel Corporation, WUS consideration for eFeMTC, 3GPP TSG RAN WG2 Meeting #101, R2-1803302, Athens, Greece, Feb. 25-Mar. 2, 2018, 6 pgs.
Intel Corporation, WUS consideration for efeMTC, 3GPP TSG RAN WG2 Meeting #99bis, R2-1710641, Prague, Czech Republic, Oct. 9-13, 2017, 7 pgs.
Sony, WUS aspects on mobility, (updated revision R2-1803134), 3GPP TSG-RAN WG2 Meeting #101b, R2-1805163, Sanya, China, Apr. 16-20, 2018, 4 pgs.
Sony, WUS aspects on grouping and mobility for efeMTC and feNB-IoT, (updated revision R2-1712993), 3GPP TSG RAN WG2 Meeting #101, R2-1803134, Athens, Greece, Feb. 26-Mar. 2, 2018, 6 pgs.
Guangdong OPPO Mobile Telecommunications Corp. Ltd., International Search Report and Written Opinion, PCT/CN2018/082715, dated Jan. 21, 2019, 10 pgs.
Guangdong OPPO Mobile Telecommunications Corp. Ltd., Examination Report, IN202027048398, dated Dec. 7, 2021, 8 pgs.
Guangdong OPPO Mobile Telecommunications Corp. Ltd., Notification of Reason for Refusal, KR10-20207032471, dated Jan. 26, 2022, 12 pgs.
Catt, "UE Power Saving and Wakeup Mechanism," Datang Telecom Technology & Industry Group, 3GPP TSG RAN Meeting #78, RP-172373, Lisbon, Portugal, Dec. 18-21, 2017, 14 pgs.
Catt, "UE Power Saving and Wakeup Mechanism," Datang Telecom Technology & Industry Group, 3GPP TSG RAN Meeting #77, RP-171881, Sapporo, Japan, Sep. 11-14, 2017, 14 pgs.
Guangdong OPPO Mobile Telecommunications Corp. Ltd., International Search Report and Written Opinion, PCT/CN2018/082715, dated Jan. 10, 2019, 10 pgs.
Huawei, HiSilicon, On 'Wake-up signal' for eFeMTC, 3GPP TSG RAN WG1 Meeting #92, R1-1801430, Athens, Greece, Feb. 26-Mar. 2, 2018, 6 pgs.
Ericsson, Downlink channel power efficiency for MTC, 3GPP TSG-RAN WG1 Meeting #92, R1-1801483, Athens, Greece, Feb. 26-Mar. 2, 2018, 11 pgs.
Guangdong OPPO Mobile Telecommunications Corp. Ltd., European Application No. EP18914282.1, First Office Action, dated Oct. 25, 2022, 5 pgs.

* cited by examiner

METHOD AND DEVICE FOR TRANSMITTING POWER SAVING SIGNAL

CROSS-REFERENCE TO RELATED APPLICATION

This application is a continuation of PCT Application No. PCT/CN2018/082715, entitled "METHOD AND DEVICE FOR TRANSMITTING POWER SAVING SIGNAL" filed Apr. 11, 2018, the entire content of which is incorporated herein by reference.

TECHNICAL FIELD

Embodiments of the present disclosure generally relate to communication technologies, and more particularly, to methods and devices for transmitting a power saving signal.

BACKGROUND

In consideration of power saving for terminal device, a Discontinuous Reception (DRX) mechanism is introduced. Each DRX cycle includes an activation period (on duration) and a dormancy period (Opportunity for DRX). When in the activation period, the terminal device detects the control channel, and when in the dormancy period (also called sleeping period), the terminal device stops receiving the control channel (the terminal device will stop the blind detection of the control channel at this time) to reduce power consumption, thereby extending the battery life.

In the 5G system, a power saving signal is introduced to control the state of the terminal device to achieve power saving purposes. For example, the power saving signal can be a wake-up signal, which is used to indicate that the terminal device wakes up in the "activation period" of a DRX cycle. When the terminal device detects the wake-up signal, it will wake up in the "activation period" to detect the PDCCH. When the terminal device does not detect the wake-up signal, it will not perform PDCCH detection. Therefore, how to design the power saving signal to realize effective transmission of the power saving signal becomes an urgent problem to be solved.

SUMMARY

Embodiments of the present disclosure provide a method and device for transmitting a power saving signal. The design of the power saving signal can realize effective transmission of the power saving signal.

According to a first aspect, there is provided a method for transmitting a power saving signal, including:

sending, by a network device, a power saving signal to a terminal device, wherein the power saving signal includes a first sequence, the first sequence is used to indicate at least part of identification information related to the terminal device, and/or the first sequence is used for the terminal device to perform time-frequency synchronization;

the identification information related to the terminal device includes: an identity of a device group which the terminal device belongs to, a device identity of the terminal device, and Physical Cell Identification (PCI) information of a cell where the terminal device resides.

According to a second aspect, there is provided a method for transmitting a power saving signal, including:

receiving, by a terminal device, a power saving signal sent from a network device, wherein the power saving signal includes a first sequence, the first sequence is used to indicate at least part of identification information related to the terminal device, and/or the first sequence is used for the terminal device to perform time-frequency synchronization; and performing, by the terminal device, a power saving operation according to the power saving signal;

the identification information related to the terminal device includes: an identity of a device group which the terminal device belongs to, a device identity of the terminal device, and Physical Cell Identification (PCI) information of a cell where the terminal device resides.

In embodiments of the present disclosure, the power saving signal includes the first sequence, and the design of the first sequence is related to specific information of the terminal device, such as the device group to which the terminal device belongs, the device identity of the terminal device, or the PCI of the cell where the terminal device resides. Terminal devices with different attributes can effectively identify their own power saving signals, and perform corresponding operations based on the power saving signals. The first sequence can also have functions such as time-frequency synchronization or measurement, which greatly improves the functions of power saving signal, and the power consumption of terminal device is further reduced.

According to an exemplary embodiment of the first or second aspect, the first sequence is used to indicate the identity of the device group which the terminal device belongs to;

there is a one-to-one correspondence between M different device groups and M first sequences, and the first sequence is a first sequence among the M first sequences which corresponds to the device group which the terminal device belongs to, and M is a positive integer.

According to an exemplary embodiment of the first or second aspect, cyclic shifts of the M first sequences are different, initial values of the M first sequences are different, scramble codes used for scrambling the M first sequences are different, positions of time domain resources for transmitting the M first sequences are different, or the M first sequences are M orthogonal sequences.

According to an exemplary embodiment of the first or second aspect, the first sequence is used to indicate the device identity of the terminal device;

there is a one-to-one correspondence between N different device identities and N first sequences, and the first sequence is a first sequences among the N first sequences which corresponds to the device identity of the terminal device, and N is a positive integer.

According to an exemplary embodiment of the first or second aspect, cyclic shifts of the N first sequences are different, initial values of the N first sequences are different, scramble codes used for scrambling the N first sequences are different, positions of time domain resources for transmitting the N first sequences are different, or the N first sequences are N orthogonal sequences.

According to an exemplary embodiment of the first or second aspect, the first sequence is used to indicate the PCI information of the cell where the terminal device resides;

there is a one-to-one correspondence between K PCI information and K first sequences, and the first sequence is a first sequence among the K first sequences which corresponds to the PCI information of the terminal device, and K is a positive integer.

According to an exemplary embodiment of the first or second aspect, cyclic shifts of the K first sequences are different, initial values of the K first sequences are different, scramble codes for scrambling the K first sequences are different, positions of the time domain resources for transmitting the K first sequences are different, or the K first sequences are K orthogonal sequences.

According to an exemplary embodiment of the first or second aspect, the first sequence is used to indicate the identity of the device group which the terminal device belongs to and the PCI information of the cell where the terminal device resides, there is a one-to-one correspondence between M×K different identification information and M×K first sequences, and the first sequence is a first sequence among the M×K first sequences which corresponds to the identification information of the terminal device.

According to an exemplary embodiment of the first or second aspect, cyclic shifts of the M×K first sequences are different, initial values of the M×K first sequences are different, scramble codes used for scrambling the MK first sequences are different, positions of time domain resources for transmitting the M×K first sequences are different, or the M×K first sequences are M×K orthogonal sequences.

According to an exemplary embodiment of the first or second aspect, the first sequence is used to indicate the device identity of the terminal device and PCI information of the cell where the terminal device resides;

there is a one-to-one correspondence between N×K different identification information and N×K first sequences, and the first sequence is a first sequence among the N×K first sequences which corresponds to the identification information of the terminal device.

According to an exemplary embodiment of the first or second aspect, cyclic shifts of the N×K first sequences are different, initial values of the N×K first sequences are different, scramble codes used for scrambling the N×K first sequences are different, positions of time domain resources used for transmitting the N K first sequences are different, or the N×K first sequences are N×K orthogonal sequences.

According to an exemplary embodiment of the first or second aspect, the PCI information of the cell where the terminal device resides includes an identity of a PCI group which the PCI of the cell where the terminal device resides in belongs to, or the PCI of the cell where the terminal device resides, wherein PCIs with a same value of PCI mod K belong to a same PCI group.

According to an exemplary embodiment of the first or second aspect, the first sequence is a ZC sequence, an M sequence or a PN sequence.

According to an exemplary embodiment of the first or second aspect, when the first sequence is used to indicate the PCI information of the cell where the terminal device resides, the first sequence is further used for the terminal device to perform Radio Resource Management (RRM) measurement.

According to an exemplary embodiment of the first or second aspect, the power saving signal further includes a first channel, and the first channel is used to indicate the identity of the device group which the terminal device belongs to or the device identity of the terminal device.

According to an exemplary embodiment of the first or second aspect, when the first sequence is not used to indicate the identity of the device group which the terminal device belongs to or the device identity of the terminal device, the first channel is further used to indicate the identity of the device group which the terminal device belongs to or the device identity of the terminal device.

According to an exemplary embodiment of the first or second aspect, the first channel is further used to indicate Bandwidth Part (BWP) information to be used by the terminal device and/or configuration information of Physical Downlink Control Channel (PDCCH) search space.

According to an exemplary embodiment of the first or second aspect, the first sequence occupies a first time domain resource, the first channel occupies a second time domain resource, and the second time domain resource is located after the first time domain resource.

According to an exemplary embodiment of the first or second aspect, the first sequence occupies a first frequency domain resource on the first time domain resource, and the first channel occupies the first frequency domain resource on the second time domain resource.

According to an exemplary embodiment of the first or second aspect, the first channel also occupies the first time domain resource. The first sequence occupies a first frequency domain resource on the first time domain resource, and the first channel occupies a second frequency domain resource on the first time domain resource and occupies a third frequency domain resource on the second time domain resource. Center frequency points of the first frequency domain resource and the third frequency domain resource are the same, the second frequency domain resource includes two equal frequency domain resources located on both sides of the first frequency domain resource, and the third frequency domain resource includes the first frequency domain resource and the second frequency domain resource.

According to an exemplary embodiment of the first or second aspect, the power saving signal further includes a second sequence, and the second sequence is used to indicate at least part of identification information related to the terminal device.

According to an exemplary embodiment of the first or second aspect, when the first sequence and/or the first channel are not used to indicate the identity of the device group which the terminal device belongs to or the device identity of the terminal device, the second sequence is used to indicate the identity of the device group which the terminal device belongs to or the device identity of the terminal device;

when the first sequence is not used to indicate the PCI information of the cell where the terminal device resides, the second sequence is used to indicate the PCI information of the cell where the terminal device resides; and when the first sequence is used to indicate a part of the PCI information of the cell where the terminal device resides, the second sequence is used to indicate the remaining part of the PCI information of the cell where the terminal device resides.

According to an exemplary embodiment of the first or second aspect, the second sequence is a ZC sequence, an M sequence or a PN sequence.

According to an exemplary embodiment of the first or second aspect, the first sequence occupies a first time domain resource, the first channel occupies a second time domain resource, a third time domain resource and a fourth time domain resource, and the second sequence occupies the third time domain resource. The first time domain resource, the second time domain resource, the third time domain resource and the fourth time domain resource are sequentially arranged from front to back in a time domain.

According to an exemplary embodiment of the first or second aspect, the first sequence occupies a first frequency domain resource on the first time domain resource, the first channel occupies a third frequency domain resource on the second time domain resource and the fourth time domain resource and occupies a second frequency domain resource on the third time domain resource, and the second sequence occupies a fourth frequency domain resource on the third time domain resource. Center frequency points of the first frequency domain resource, the third frequency domain resource and the fourth frequency domain resource are the same, the second frequency domain resource includes two equal frequency domain resources located on both sides of the fourth frequency domain resource, the third frequency domain resource includes the second frequency domain resource and the fourth frequency domain resource, and a width of the first frequency domain resource is less than or equal to a width of the third frequency domain resource.

According to an exemplary embodiment of the first or second aspect, the first sequence occupies a first time domain resource, the first channel occupies a second time domain resource, and the second sequence occupies a third time domain resource. The first time domain resource, the second time domain resource, and the third time domain resource are sequentially from front to back in the time domain.

According to an exemplary embodiment of the first or second aspect, the first sequence occupies a first frequency domain resource on the first time domain resource, the first channel occupies the first frequency domain resource on the second time domain resource, and the second sequence occupies the first frequency domain resource on the third time domain resource.

According to an exemplary embodiment of the first or second aspect, the first channel also occupies the third time domain resource. The first sequence occupies a first frequency domain resource on the first time domain resource, the first channel occupies a third frequency domain resource on the second time domain resource and occupies a second frequency domain resource on the third time domain resource, and the second sequence occupies a fourth frequency domain resource on the third time domain resource. Center frequency points of the first frequency domain resource, the third frequency domain resource and the fourth frequency domain resource are the same, the second frequency domain resource includes two equal frequency domain resources located on both sides of the fourth frequency domain resource, the third frequency domain resource includes the second frequency domain resource and the fourth frequency domain resource, and a width of the first frequency domain resource is less than or equal to a width of the third frequency domain resource.

According to an exemplary embodiment of the first or second aspect, the first sequence occupies a first time domain resource, the second sequence occupies a second time domain resource, and the first channel occupies a third time domain resource. The first time domain resource, the second time domain resource and the third time domain resource are arranged sequentially from front to back in a time domain.

According to an exemplary embodiment of the first or second aspect, the first sequence occupies a first frequency domain resource on the first time domain resource, the second sequence occupies the first frequency domain resource on the second time domain resource, and the first channel occupies the first frequency domain resource on the third time domain resource.

According to an exemplary embodiment of the first or second aspect, the first channel also occupies the second time domain resource. The first sequence occupies a first frequency domain resource on the first time domain resource, the second sequence occupies a fourth frequency domain resource on the second time domain resource, and the first channel occupies a second frequency domain resource on the second time domain resource and occupies a third frequency domain resource on the third time domain resource. Center frequency points of the first frequency domain resource, the third frequency domain resource and the fourth frequency domain resource are the same, the second frequency domain resource includes two equal frequency domain resources located on both sides of the fourth frequency domain resource, the third frequency domain resource includes the second frequency domain resource and the fourth frequency domain resource, and a width of the first frequency domain resource is less than or equal to a width of the third frequency domain resource.

According to an exemplary embodiment of the first or second aspect, the first sequence occupies a first time domain resource, the second sequence occupies a second time domain resource, the first channel occupies the second time domain resource, and the second time domain resource is located after the first time domain resource.

According to an exemplary embodiment of the first or second aspect, the first sequence occupies a first frequency domain resource on the first time domain resource, the first channel occupies a second frequency domain resource on the second time domain resource, and the second sequence occupies a fourth frequency domain resource on the second time domain resource. Center frequency points of the first frequency domain resource and the fourth frequency domain resource are the same, the second frequency domain resource includes two equal frequency domain resources located on both sides of the fourth frequency domain resource, a sum of the fourth frequency domain resource and the second frequency domain resource is a third frequency domain resource, and a width of the first frequency domain resource is less than or equal to a width of the third frequency domain resource.

According to an exemplary embodiment of the first or second aspect, the first channel also occupies the first time domain resource. The first sequence occupies a first frequency domain resource on the first time domain resource, the second sequence occupies the first frequency domain resource on the second time domain resource, and the first channel occupies a second frequency domain resource on both the first time domain resource and the second time domain resource. The second frequency domain resource includes two equal frequency domain resources located on both sides of the first frequency domain resource, and a sum of the first frequency domain resource and the second frequency domain resource is a third frequency domain resource.

According to an exemplary embodiment of the first or second aspect, the first frequency domain resource includes 12+P Physical Resource Blocks (PRBs), the third frequency domain resource includes 20 PRBs, the fourth frequency domain resource includes 12 PRBs, and each of the two equal frequency domain resources located on both sides of the fourth frequency domain resource included in the second frequency domain resource includes 4 PRBs, P being a natural number.

According to an exemplary embodiment of the first or second aspect, the first sequence is a Primary Synchronization Signal (PSS), the second sequence is a Secondary Synchronization Signal (SSS), a channel structure of the first channel is same as a channel structure of Physical Broadcast Channel (PBCH), and a payload carried by the first channel is different from a payload carried by the PBCH.

According to a third aspect, there is provided a network device. The network device can perform operations of the network device in the first aspect or any exemplary embodiment of the first aspect. Specifically, the network device may include a network device configured to execute the method in the first aspect or any exemplary embodiment of the first aspect.

According to a fourth aspect, there is provided a terminal device. The terminal device can perform operations of the terminal device in the second aspect or any exemplary embodiment of the second aspect. Specifically, the terminal device may include a terminal device configured to execute the method in the second aspect or any exemplary embodiment of the second aspect.

According to a fifth aspect, there is provided a network device. The network device includes a processor, a transceiver, and a memory. The processor, the transceiver and the memory communicate with each other through internal connection paths. The memory is configured to store instructions, and the processor is configured to execute the instructions stored in the memory. When the processor executes the instructions stored in the memory, the network device is caused to execute the method in the first aspect or any exemplary embodiment of the first aspect, or the network device is caused to implement the network device according to the third aspect.

According to a sixth aspect, there is provided a terminal device. The terminal device includes a processor, a transceiver, and a memory. The processor, the transceiver and the memory communicate with each other through internal connection paths. The memory is configured to store instructions, and the processor is configured to execute the instructions stored in the memory. When the processor executes the instructions stored in the memory, the terminal device is caused to execute the method in the second aspect or any exemplary embodiment of the second aspect, or the network device is caused to implement the terminal device according to the fourth aspect.

According to a seventh aspect, there is provided a system chip. The system chip includes an input interface, an output interface, a processor, and a memory. The processor is configured to execute instructions stored in the memory. When the instructions are executed, the processor can implement the method of the first aspect or any exemplary embodiment of the first aspect.

According to an eighth aspect, there is provided a system chip. The system chip includes an input interface, an output interface, a processor, and a memory. The processor is configured to execute instructions stored in the memory. When the instructions are executed, the processor can implement the method of the second aspect or any exemplary embodiment of the second aspect.

According to a ninth aspect, there is provided a computer program product including instructions. When the computer program product runs on a computer, the computer is caused to perform the method in the first aspect or any exemplary embodiment of the first aspect.

According to a tenth aspect, there is provided a computer program product including instructions. When the computer program product runs on a computer, the computer is caused to perform the method in the second aspect or any exemplary embodiment of the second aspect.

BRIEF DESCRIPTION OF THE DRAWINGS

FIG. 1A is a schematic diagram showing a structure of a power saving signal according to an embodiment of the present disclosure.

DETAILED DESCRIPTION

The technical solutions of embodiments of the present disclosure can be applied to various communication systems, for example, a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD), a Universal Mobile Telecommunication System (UMTS), a Worldwide Interoperability for Microwave Access (WiMAX) communication system, or a future 5G system.

Figure 1:
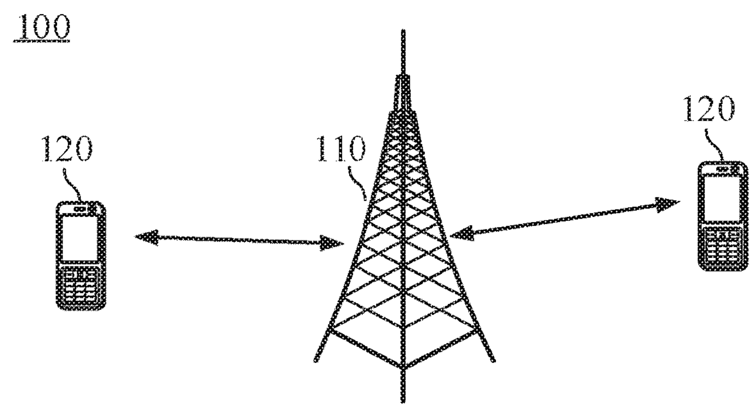
FIG. 1 is a schematic diagram of a possible wireless communication system in which embodiments of the present disclosure may be applied.

FIG. 1 shows a wireless communication system 100 to which embodiments of the present disclosure can be applied. The wireless communication system 100 can include a network device 110. The network device 110 can be a device that communicates with a terminal device. The base station 110 can provide communication coverage for a particular geographic area and can communicate with terminal devices (e.g., UEs) within the coverage area. According to exemplary embodiments, the network device 110 may be a base station (Base Transceiver Station, BTS) in a GSM system or a CDMA system, or a base station (NodeB, NB) in a WCDMA system, or an evolved base station (evolutional Node B, eNB or eNodeB) in an LTE system, or a wireless controller in a Cloud Radio Access Network (CRAN), or the network device may be a relay station, an access point, an in-vehicle device, a wearable device, a network side device in a future 5G network, or a network device in a future evolved Public Land Mobile Network (PLMN).

The wireless communication system 100 also includes at least one terminal device 120 located within the coverage of the network device 110. Terminal device 120 can be mobile or fixed. According to exemplary implementations, the terminal device 120 may refer to an access terminal, user equipment (UE), a subscriber unit, a subscriber station, a mobile station, a mobile terminal, a remote station, a remote terminal, a mobile device, a user terminal, a terminal, a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), a handled device with wireless communication functions, a computing device or other processing device connected to wireless modems, an in-vehicle device, a wearable device, a terminal device in future 5G networks, or a terminal device in a future evolved PLMN, and the like. According to embodiments, the terminal devices 120 may perform Device to Device (D2D) with each other.

FIG. 1 exemplarily shows one network device and two terminal devices. According to other embodiments, the wireless communication system 100 may include multiple network devices and may include other numbers of terminal devices within the coverage of each network device. Embodiments of the present disclosure do not impose specific limitations on this.

According to exemplary embodiments, the wireless communication system 100 may further include other network entities, such as a network controller, a mobility management entity, and the like, and embodiments of the present disclosure do not impose specific limitations on this.

Figure 2:
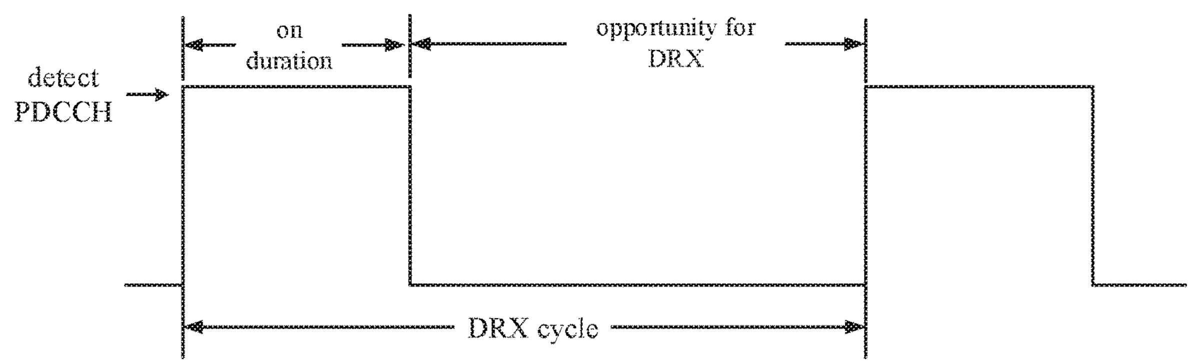
FIG. 2 is a schematic diagram of a DRX cycle.

The DRX cycle of a terminal device includes an activation period (on duration) and a sleeping period (opportunity for DRX). For example, as shown in FIG. 2, the terminal device can detect the Physical Downlink Control Channel (PDCCH) during the activation period, that is, during the on duration; and, the terminal device can stop receiving PDCCH during the sleeping period (the opportunity for DRX) (the terminal device will stop blind detection of PDCCH or paging messages) to reduce power consumption, thereby extending battery life. In other words, the terminal device is in a wake-up state during the wake-up period to detect the PDCCH, and the terminal device enters the sleeping state during the sleeping period and does not perform channel or signal detection.

Although the network configures the DRX cycle for a terminal device to make the terminal device periodically detect the PDCCH during the activation period, the terminal device is only scheduled opportunistically during the activation period, and even when the service load of the terminal device is very low, the terminal device may be scheduled in a few DRX cycles. For transmission of paging messages with the DRX mechanism, the terminal device has fewer opportunities to receive the paging messages. Therefore, after the terminal device is configured with the DRX mechanism, the control channel may not be detected during the activation period of most DRX cycles, but the terminal device is still awakened during the activation period of these DRX cycles, thus increasing unnecessary power consumption of terminal device.

Therefore, a power saving signal is introduced in the 5G system to control the wake-up and/or sleep state of the terminal device to achieve the purpose of power saving. The power saving signal is used to control the wake-up and sleep states of the terminal device, so that the power consumption of the terminal device can be reduced. For example, the power saving signal may be a wake-up signal which is used to indicate that the terminal device wakes up during the "activation period" in the DRX cycle. When the terminal device detects the wake-up signal, the terminal device can wake up in one or more subsequent "activation period" to detect the PDCCH. When the terminal device does not detect the wake-up signal, the terminal device can maintain sleeping in one or more subsequent activation periods without PDCCH detection. Alternatively, the wake-up signal is used to indicate that the terminal device sleeps during the "activation period" in the DRX cycle; when the terminal device does not detect the wake-up signal, the terminal device can wake up normally in the subsequent one or more "activation periods" to detect the PDCCH. When the terminal device detects the wake-up signal, the terminal device can maintain the sleep state in one or more subsequent activation periods without PDCCH detection. Since this kind of indication information is conducive to the power saving of the terminal device, we call it a power saving signal.

Embodiments of the present disclosure proposes that the power saving signal includes a first sequence, and the design of the first sequence is related to specific information of the terminal device, such as a device group to which the terminal device belongs, a device identity of the terminal device, or the PCI of a cell where the terminal device resides. Terminal devices with different attributes can effectively identify their own power saving signals, and perform corresponding operations based on the power saving signals. The first sequence can also have functions such as time-frequency synchronization or measurement, which greatly improves the functions of power saving signal, and the power consumption of terminal device is further reduced.

Figure 3:
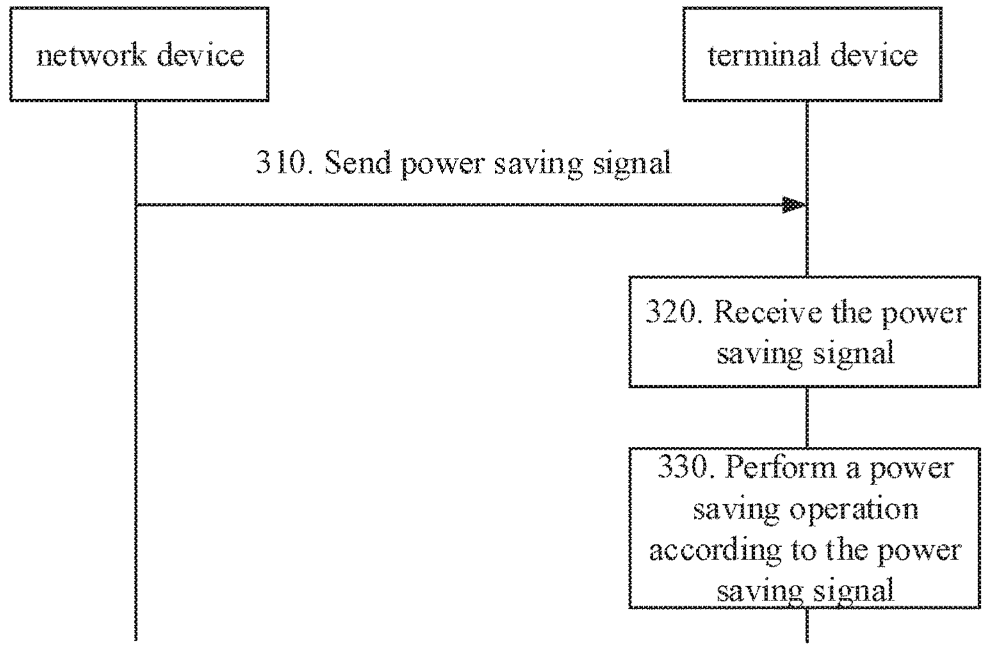
FIG. 3 is a flow chart of method for transmitting a power saving signal according to an embodiment of the present disclosure.

FIG. 3 is a flowchart showing interactions in a signal transmission method 300 according to an embodiment of the present disclosure. The terminal device shown in FIG. 3 may be, for example, the terminal device 120 shown in FIG. 1. The network device shown in FIG. 3 may be, for example, the network device 110 shown in FIG. 1. As shown in FIG. 3, the signal transmission method 300 includes some or all of the following contents:

In 310, the network device sends a power saving signal to the terminal device.

In 320, the terminal device receives the power saving signal sent from the network device.

The power saving signal includes a first sequence. The first sequence is used to indicate at least part of identification information related to the terminal device, and/or the first sequence is used for the terminal device to perform time-frequency synchronization.

The identification information related to the terminal device includes: an identity of a device group which the terminal device belongs to, a device identity (UE Identity, UE ID) of the terminal device, or the Physical Cell Identification (PCI) information of a cell where the terminal device resides.

According to embodiments, the first sequence may be a Zadoff-Chu (ZC) sequence, an M sequence, or a Pseudo Noise Sequence (PN sequence).

In 330, the terminal device performs a power saving operation according to the power saving signal.

According to embodiments, when the first sequence is used to indicate the PCI information of the terminal device, the first sequence is also used for the terminal device to perform Radio Resource Management (RRM) measurement.

Specifically, the network device sends a power saving signal to the terminal device. The power saving signal is used to control the wake-up and/or sleep state of the terminal device to reduce the power consumption of the terminal device. After the terminal device receives the power saving signal, the terminal device performs the power saving operation based on the indication of the power saving signal, that is, perform wake-up and/or sleep operations. For example, the power saving signal indicates that the terminal device wakes up or sleeps during part or all of the time of the activation period in one or several subsequent DRX cycles. After receiving the power saving signal, the terminal device can follow the indication of the power saving signal to perform corresponding power saving operations, that is, wake up or sleep during part or all of the time of the activation period in one or several DRX cycles. The power saving signal includes a first sequence, and the first sequence carries at least part of the identification information related to the terminal device. According to embodiments, the first sequence may also be used for the terminal device to perform time-frequency synchronization. When the first sequence carries the PCI information of the cell where the terminal device resides, the first sequence may also be used for the terminal device to perform RRM measurement. When the terminal device receives the power saving signal, the terminal device can determine whether the power saving signal is a power saving signal for the terminal device according to the identification information carried in the first sequence. If the power saving signal is a power saving signal for the terminal device, the terminal device performs a corresponding power saving operation according to the power saving signal. When the first sequence is also used for the terminal device to perform time-frequency synchronization, the terminal device may also perform time-frequency synchronization based on the power saving signal. When the first sequence is also used for the terminal device to perform RRM measurement, the terminal device may also perform RRM measurement based on the first sequence.

In embodiments of the present disclosure, the power saving signal includes the first sequence, and the design of the first sequence is related to specific information of the terminal device, such as the device group to which the terminal device belongs, the device identity of the terminal device, or the PCI of the cell where the terminal device resides. Terminal devices with different attributes can effectively identify their own power saving signals, and perform corresponding operations based on the power saving signals. The first sequence can also have functions such as time-frequency synchronization or measurement, which greatly improves the functions of power saving signal, and the power consumption of terminal device is further reduced.

For a terminal device in a connected state, since the terminal device has already achieved time-frequency synchronization with the network device, the power saving signal may not have the function of time-frequency synchronization. Under such condition, the first sequence may only carry the information of the device group which the terminal device belongs to or the UE ID.

If the first sequence also carries the PCI information of the cell where the terminal device resides, mutual influence of different power saving signals between cells can be avoided.

When the first sequence is used to indicate at least part of the identification information related to the terminal device, embodiments of the present disclosure provides the following five types of first sequences.

Type 1

The first sequence is used to indicate the identity of the device group which the terminal device belongs to.

If there are M device groups, the M device groups correspond to M first sequences one to one, and the first sequence included in the power saving signal is a first sequence corresponding to the device group which the terminal device belongs to among the M device groups, and M is a positive integer.

According to embodiments, cyclic shifts of the M first sequences are different, initial values of the M first sequences are different, scramble codes used for scrambling the M first sequences are different, positions of time domain resources used for transmitting the M first sequences are different, or the M first sequences are M orthogonal sequences.

That is, M different first sequences can be used to identify M device groups. For example, M first sequences with different cyclic shifts are used to identify M device groups, M first sequences with different initial values are used to identify M device groups, M first sequences scrambled based on M different scramble codes are used to identify M device groups, or M orthogonal first sequences are used to identify M device groups.

For example, the manner by which the first sequences indicate the identification of the device groups may be similar to the manner in which the Primary Synchronization Signal (PSS) in the LTE or NR system indicates the PCI information. When the first sequences are PN sequences, different initial values can be used.

Figure 4:
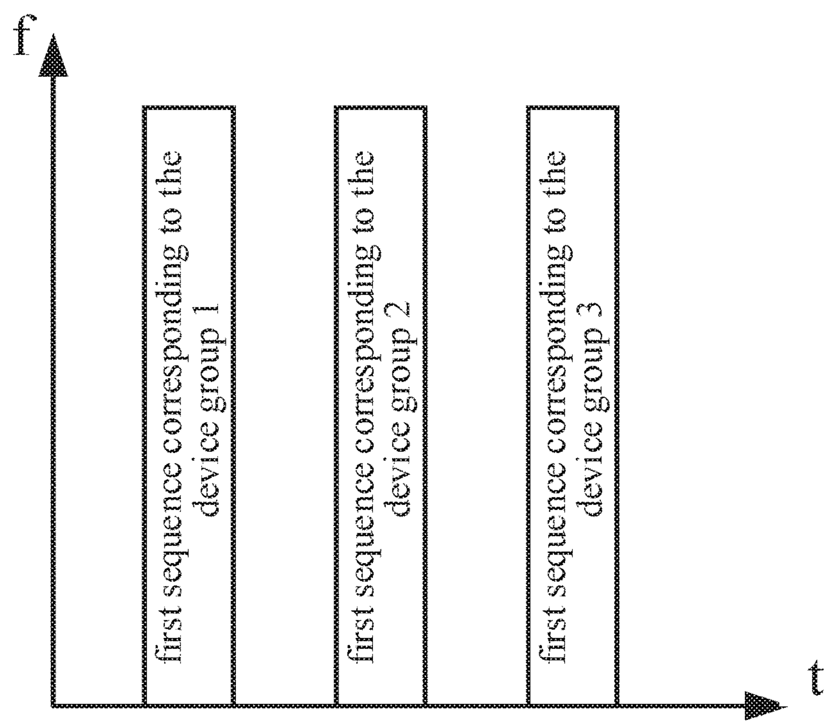
FIG. 4 is a schematic diagram showing transmission of a first sequence according to an embodiment of the present disclosure.

Alternatively, different device groups may be identified by different time domain positions for transmitting the first sequences. For example, as shown in FIG. 4, the first sequence transmitted by the network device at time domain resource position 1 is used to indicate a terminal device in device group 1, the first sequence transmitted by the network device at time domain resource position 2 is used to indicate a terminal device in device group 2, and the first sequence transmitted by the network device at time domain resource position 3 is used to indicate a terminal device in device group 3.

According to embodiments, the device group which the terminal device belongs to may be determined according to the UE-ID of the terminal device or the access class of the terminal device.

Type 2

The first sequence is used to indicate the UE ID of the terminal device.

N different device identities correspond to N first sequences one to one, and the first sequence included in the power saving signal is a first sequence among the N first sequences which corresponds to the device identity of the terminal device, and N is a positive integer.

According to embodiments, cyclic shifts of the N first sequences are different, initial values of the N first sequences are different, scramble codes used for scrambling the N first sequences are different, positions of time domain resources used for transmitting the N first sequences are different, or the N first sequences are N orthogonal sequences.

That is, N different first sequences can be used to identify N different terminal devices. For example, N first sequences with different cyclic shifts are used to identify N terminal devices, N first sequences with different initial values are used to identify N terminal devices, N first sequences scrambled based on N different scramble codes are used to identify N terminal devices, or N orthogonal first sequences are used to identify N terminal devices.

For example, the manner in which the first sequence indicates the UE ID may be similar to the manner in which the PSS in the LTE or NR system indicates PCI information. When the first sequences are PN sequences, different initial values can be used.

Type 3

The first sequence is used to indicate the PCI information of the cell where the terminal device resides.

If there is K PCI information, K different PCI information corresponds to K first sequences one to one, and the first sequence included in the power saving signal is a first sequence among the K first sequences which corresponds to the PCI information of the cell where the terminal device resides, and K is a positive integer.

According to embodiments, the PCI information of the cell where the terminal device resides includes an identity of a PCI group which the PCI of the cell where the terminal device resides belongs to, or the PCI of the cell where the terminal device resides. PCIs with the same value of PCI mod K belong to the same PCI group.

The first sequence may carry the identity of the PCI group which the PCI of the cell where the terminal device resides belongs to, or directly carry the PCI of the cell where the terminal device resides. If the PCI information is not carried in the first sequence itself, then K different time domain positions can be used to indicate this part of information.

For example, it is assumed that the first sequence carries the identity of the PCI group which the PCI of the cell where the terminal device resides belongs to, and K is equal to 3, then PCIs with the same value of PCI mod 3 belong to the same PCI group, and terminal devices, the cells of which have PCI belonging to the same PCI group, correspond to the same first sequence. Under such condition, if the network device needs to indicate the cell with PCI=4 by the first sequence, the identity of the PCI group indicated by the PCI information carried in the first sequence may be 4 mod 3=1. If the network device needs to indicate the cell with PCI=5 by the first sequence, the identity of the PCI group indicated by the PCI information carried in the first sequence may be 5 mod 3=2. If the network device needs to indicate the cell with PCI=6 by the first sequence, the identity of the PCI group indicated by the PCI information carried in the first sequence may be 6 mod 3=0

According to embodiments, cyclic shifts of the K first sequences are different, initial values of the K first sequences are different, scramble codes used for scrambling the K first sequences are different, positions of time domain resources for transmitting the K first sequences are different, or the K first sequences are K orthogonal sequences.

That is, K different first sequences can be used to identify K different PCI information. For example, K first sequences with different cyclic shifts are used to identify K PCI information, K first sequences with different initial values are used to identify K PCI information, K first sequences scrambled based on K different scramble codes are used to identify K PCI information, or K orthogonal first sequences are used to identify K PCI information.

For example, the manner in which the first sequence indicates PCI information may be similar to the manner in which the PSS in the LTE or NR system indicates PCI information. If the first sequences are PN sequences, different initial values can be used.

Figure 5:
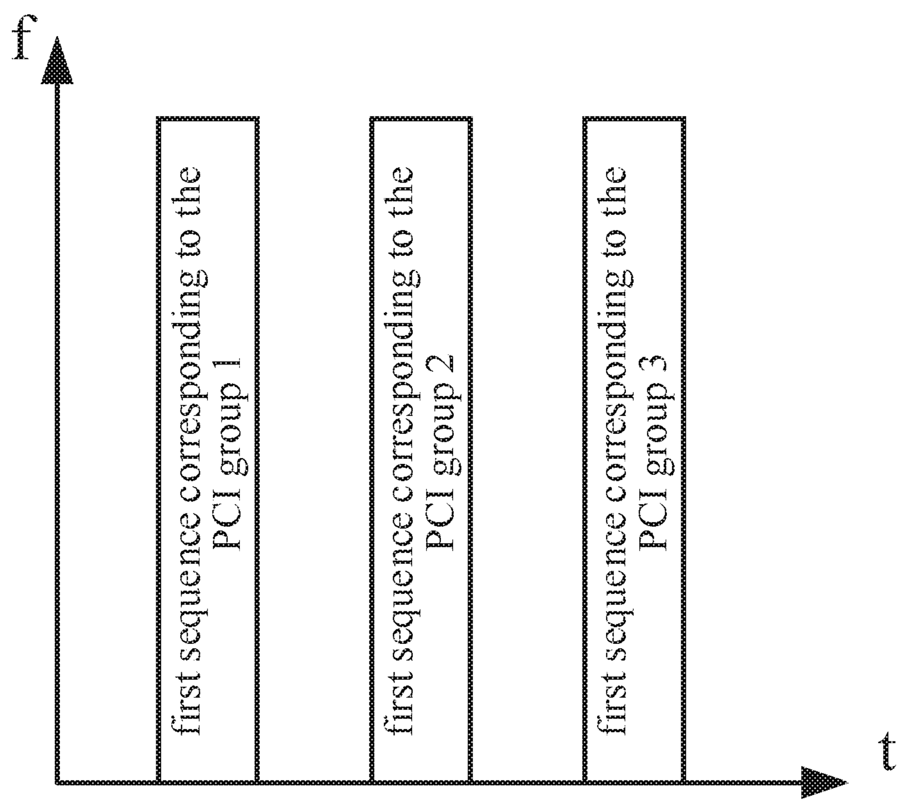
FIG. 5 is a schematic diagram showing transmission of a first sequence according to an embodiment of the present disclosure.

Alternatively, different PCI information can be identified by different time domain positions for transmitting the first sequences. For example, as shown in FIG. 5, the first sequence transmitted by the network device at time domain resource position 1 is used to indicate PCI group 1, the first sequence transmitted by the network device at time domain resource position 2 is used to indicate PCI group 2, and the first sequence transmitted by the network device at time domain resource position 3 is used to indicate PCI group 3.

Type 4

The first sequence is used to indicate the identity of the device group which the terminal device belongs to and the PCI information of the cell where the terminal device resides.

If the first sequence indicates the device group and PCI information at the same time, assuming that there are M different device groups and K different PCI information, then M×K different identification information correspond to M×K first sequences one to one. The first sequence included in the power saving signal is a first sequence among the M×K first sequences which corresponds to the identification information of the terminal device.

According to embodiments, cyclic shifts of the M×K first sequences are different, initial values of the M×K first sequences are different, scramble codes used for scrambling the M×K first sequences are different, positions of time domain resources for transmitting the M×K first sequences are different, or the M×K first sequences are M×K orthogonal sequences.

When the PCI information of cells where terminal devices reside is the same, the terminal devices may belong to different device groups; or, the PCI information of the cells where the terminal devices resides is different, but the device groups which the terminal device belongs to are the same; or the PCI information of the cells where the terminal devices resides and the device groups which the terminal devices belong to are both different. Under such condition, M×K different first sequences are needed to distinguish the M×K groups of different identification information, that is, M×K different first sequences are used to identify the M×K groups of different identification information. For example, M×K first sequences with different cyclic shifts are used to identify M×K groups of different identification information, M×K first sequences with different initial values are used to identify M×K groups of different identification information, M×K first sequence scrambled by M×K different scramble codes are used to identify the M×K group of different identification information, M×K orthogonal first sequences are used to identify the M×K group of different identification information, or different time domain positions for transmitting the first sequences are used to distinguish different identification information.

Type 5

The first sequence is used to indicate the UE ID of the terminal device and the PCI information of the cell where the terminal device resides.

If the first sequence indicates UE ID and PCI information at the same time, assuming that there are N different UE IDs and K different PCI information, then N×K different identification information correspond to N×K first sequences one to one. The first sequence included in the power saving signal is a first sequence among the N×K first sequences which corresponds to the identification information of the terminal device.

According to embodiments, cyclic shifts of the N×K first sequences are different, initial values of the N K first sequences are different, scramble codes used for scrambling the N×K first sequences are different, positions of time domain resources for transmitting the N×K first sequences are different, or the N×K first sequences are N×K orthogonal sequences.

When the PCI information of the cells where terminal devices reside is the same, UE IDs may be different; or, the PCI information of the cells where terminal devices reside and UE IDs are both different. At this time, N×K different first sequences are needed to distinguish N×K groups of different identification information, that is, N×K different first sequences are used to identify N×K groups of different identification information. For example, N×K first sequences with different cyclic shifts are used to identify N×K groups of different identification information, N×K first sequences with different initial values are used to identify N×K groups of different identification information, N×K first sequences scrambled by N×K different scrambling codes are used to identify N×K groups of different identification information, N×K orthogonal first sequences are used to identify N×K groups of different identification information, or different time domain positions for transmitting the first sequences are used to distinguish different identification information.

In embodiments of the present disclosure, the power saving signal may further include a first channel. The first channel is used to indicate the identity of the device group which the terminal device belongs to or the UE ID of the terminal device.

The first channel may carry a data part (for example, including indication information indicating that the terminal device wakes up or sleeps during all or part of the time of the activation period in one or more DRX cycles) and its pilot. According to embodiments, the pilot may be generated based on the PCI of the cell where the terminal device resides. Since a physical channel is used to carry power saving information, it is easier to carry information compared to using sequences.

For example, when the first sequence is not used to indicate the identity of the device group which the terminal device belongs to or the device identity of the terminal device, the first channel may be used to indicate the identity of the device group which the terminal device belongs to or the device identity of the terminal device.

That is, the first channel may be used to carry at least part of the identification information in the identification information related to the terminal device.

According to embodiments, the first channel may further indicate the Bandwidth Part (BWP) information (such as BWP activation information) to be used by the terminal device and/or configuration information of the Physical Downlink Control Channel (PDCCH) search space.

In embodiments of the present disclosure, the power saving signal may further include a second sequence. The second sequence may be used to indicate at least part of the identification information in the identification information related to the terminal device.

According to embodiments, the second sequence is a ZC sequence, an M sequence or a PN sequence.

For example, when the first sequence and/or the first channel are not used to indicate the identity of the device group which the terminal device belongs to or the device identity of the terminal device, the second sequence is used to indicate the identity of the device group which the terminal device belongs to or the device identity of the terminal device.

When the power saving signal includes the first sequence and the second sequence, the first sequence may not carry the identity of the device group which the terminal device belongs to or the device identity of the terminal device, and the second sequence is used to indicate the identity of the device group which the terminal device belongs to or the device identity of the terminal device. Under such condition, the first sequence may be used for time-frequency synchronization or the first sequence may carry PCI information for RRM measurement, for example.

When the power saving signal includes the first sequence, the first channel and the second sequence, the first sequence and the first channel may not carry the identity of the device group which the terminal device belongs to or the device identity of the terminal device, the second sequence is used to carry the identity of the device group which the terminal device belongs to or the device identity of the terminal device. Under such condition, the first sequence may be used for time-frequency synchronization or the first sequence may carry PCI information for RRM measurement, for example.

That is, in embodiments of the present disclosure, the identity of the device group which the terminal device belongs to or the device identity of the terminal device carried by the power saving signal may be carried in any one of the first sequence, the first channel, and the second sequence.

For another example, when the first sequence is not used to indicate the PCI information of the cell where the terminal device resides, the second sequence is used to indicate the PCI information of the cell where the terminal device resides.

If the power saving signal includes the first sequence and the second sequence, or includes the first sequence, the first channel and the second sequence, when the first sequence is not used to indicate the PCI information of the cell where the terminal device resides, the second sequence can be used to indicate the PCI information of the cell where the terminal device resides.

For another example, when the first sequence is used to indicate part of the PCI information of the cell where the terminal device resides, the second sequence is used to indicate the remaining part of the PCI information of the cell where the terminal device resides.

If the power saving signal includes the first sequence and the second sequence, or includes the first sequence, the first channel and the second sequence, when the first sequence is used to indicate part of the PCI information of the cell where the terminal device resides, the second sequence may be used to indicate the remaining part of the PCI information of the cell where the terminal device resides.

The part of PCI information of the cell where the terminal device resides indicated by the first sequence may be information of the PCI group which the PCI of the cell where the terminal device resides belongs to. PCIs with the same value of PCI mod K belong to the same PCI group. The remaining part of the PCI information of the cell where the terminal device resides indicated by the second sequence may be a value corresponding to the cell where the terminal device resides in the PCI group which the PCI belongs to. It can be understood that the part of PCI information indicated by the first sequence is PCI mod K, and the actual PCI of the cell where the terminal device resides is a sum of the value of the part of PCI information indicated by the second sequence multiplied by K, and PCI mod K.

For example, assuming K=3, if the PCI information indicated by the first sequence is the identity of the PCI group which the PCI of the cell where the terminal device resides belongs to, and PCIs with the same value of PCI mod 3 belong to the same PCI group, then PCIs with the value of PCI mod 3=0 belongs to a PCI group, PCIs with a value of PCI mod 3=1 belongs to a PCI group, and PCIs with a value of PCI mod 3=2 belongs to a PCI group.

If the second sequence indicates 0, when the first sequence indicates PCI mod 3=0, the PCI of the cell where the terminal device resides is 0×3+0=0; when the first sequence indicates PCI mod 3=1, the PCI of the cell where the terminal device resides is 0×3+1=1; when the first sequence indicates PCI mod 3=2, the PCI of the cell where the terminal device resides is 0×3+2=2.

If the second sequence indicates 1, when the first sequence indicates PCI mod 3=0, the PCI of the cell where the terminal device resides is 1×3+0=3; when the first sequence indicates PCI mod 3=1, the PCI of the cell where the terminal device resides is 1×3+1=4; when the first sequence indicates PCI mod 3=2, the PCI of the cell where the terminal device resides is 1×3+2=5.

If the second sequence indicates 2, when the first sequence indicates PCI mod 3=0, the PCI of the cell where the terminal device resides is 2×3+0=6; when the first sequence indicates PCI mod 3=1, the PCI of the cell where the terminal device resides is 2×3+1=7; when the first sequence indicates PCI mod 3=2, the PCI of the cell where the terminal device resides is 2-3+2=8.

Therefore, the terminal device can recognize which cell the power saving signal indicates according to the first sequence and the second sequence.

In embodiments of the present disclosure, the first sequence may be a Primary Synchronization Signal (PSS), and the second sequence may be a Secondary Synchronization Signal (SSS)

According to embodiments, the channel structure of the first channel is the same as the channel structure of a Physical Broadcast Channel (PBCH), and the payload carried by the first channel is different from the payload carried by the PBCH.

It should be understood that the payload carried by the first channel is different from the payload carried by the PBCH, which may mean that the information content carried in the payload field of the first channel is different from the information content carried in the payload field of the PBCH, and/or, the size of the payload field (that is, the number of bits) of the first channel is different from the size of the payload field of the PBCH.

For example, the payload of the PBCH channel is mainly broadcast information, such as including System Frame Number (SFN), SSB index and other information. The payload of the first channel mainly includes indication information used to give power saving instructions to the terminal device (for example, instructing the terminal device to wake up or sleep), and optionally, the payload may also include the BWP information (for example, BWP activation information) to be used by the terminal device and/or configuration information of PDCCH search space. Here, the first channel may be referred to as a power saving indication (PSI) for short.

The information content indicated by the power saving signal is described above with reference to FIGS. 3 to 5, and the channel structure of the power saving signal is described below with reference to FIGS. 6 to 11.

In order to reduce the impact on the existing standards, the structure of the power saving signal in embodiments of the present disclosure reuses the structure of the Synchronizing Signal Block (SSB or SS Block) in whole or in part, thereby reducing the impact on the existing standards, while reducing additional complexity of implementation of the terminal device.

Figure 6:
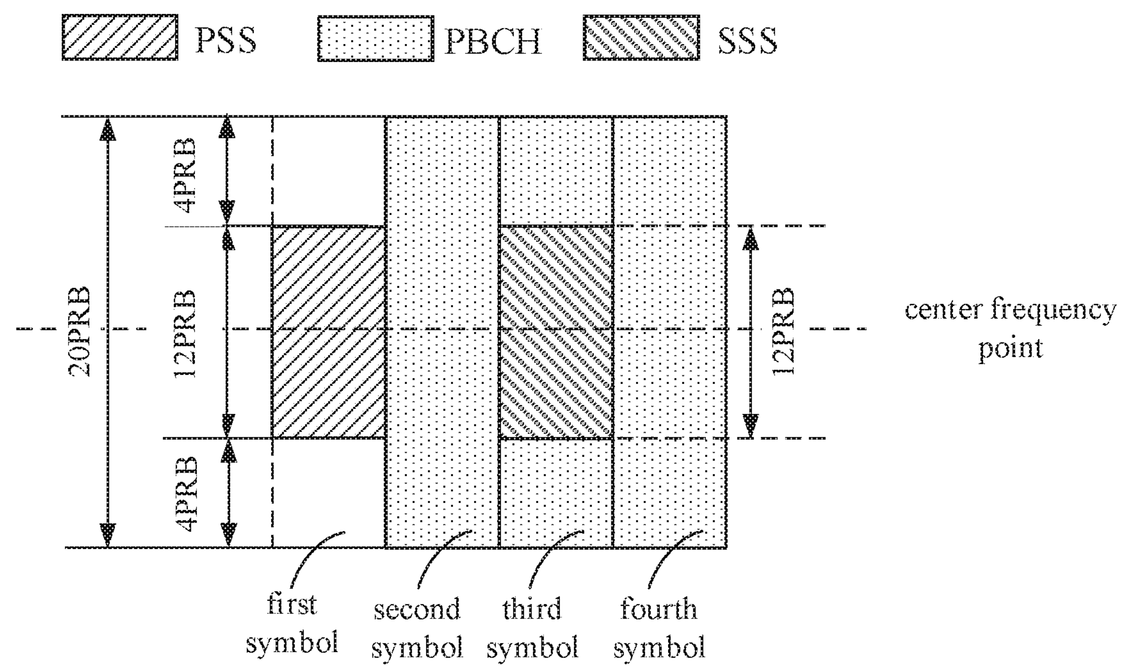
FIG. 6 is a schematic diagram showing the structure of a synchronization signal block.

FIG. 6 is a schematic diagram of a synchronization signal block. The synchronization signal block includes four time domain symbols. The PSS signal is transmitted on the first symbol, and the PSS signal occupies 12 PRBs. PBCH is transmitted on the second time domain symbol and the fourth time domain symbol, and the PBCH occupies 20 PRBs. On the third time domain symbol, the 12 PRBs in the center are used to transmit SSS, and the 4 PRBs on both sides are used to transmit PBCH. The demodulation pilot of PBCH is PBCH Demodulation Reference Signal (DMRS).

The structures of several typical power saving signals provided by embodiments of the present disclosure will be described below. The first time domain resource, the second time domain resource, the third time domain resource, and the fourth time domain resource described below are sequentially arranged from front to back in the time domain. According to embodiments, the first time domain resource, the second time domain resource, the third time domain resource, and the fourth time domain resource have the same length. In particular, the first time domain resource, the second time domain resource, the third time domain resource, and the fourth time domain resource may be four consecutive time domain symbols in sequence.

For example, the first time domain resource may correspond to the first time domain symbol in FIG. 6, the second time domain resource may correspond to the second time domain symbol in FIG. 6, the third time domain resource may correspond to the three time domain symbols in FIG. 6, and the fourth time domain resource may correspond to the fourth time domain symbol in FIG. 6.

In the first frequency domain resource, the second frequency domain resource, the third frequency domain resource and the fourth frequency domain resources described below, center frequency points of the first frequency domain resources, the third frequency domain resources, and the fourth frequency domain resources are the same, the second frequency domain resource includes two equal frequency domain resources located on both sides of the fourth frequency domain resource, the third frequency domain resource includes the second frequency domain resource and the fourth frequency domain resource, and the width of the first frequency domain resource is less than or equal to the width of the third frequency domain resource.

For example, the first frequency domain resource may correspond to the frequency domain resource for transmitting PSS on the first time domain symbol in FIG. 6, the third frequency domain resource may correspond to the frequency domain resource for transmitting PBCH on the second time domain symbol and the fourth time domain symbol in FIG. 6, the fourth frequency domain resource may correspond to the frequency domain resource for transmitting the SSS on the three time domain symbols in FIG. 6, the second frequency domain resource may correspond to the frequency domain resource for transmitting the PBCH on the third time domain symbol in FIG. 6.

The channel structure of the power saving signal (in other words, the relationship between the positions of the time-frequency resources occupied by the first sequence, the first signal and/or the second sequence) in embodiments of the present disclosure will be described with reference to FIGS. 7 to 11. Embodiments of the provide fives possible types of structures of the power saving signal as examples.

Type 1 Structure

The first sequence occupies a first time domain resource, the first channel occupies a second time domain resource, a third time domain resource and a fourth time domain resource, and the second sequence occupies the third time domain resource.

Figure 7A:
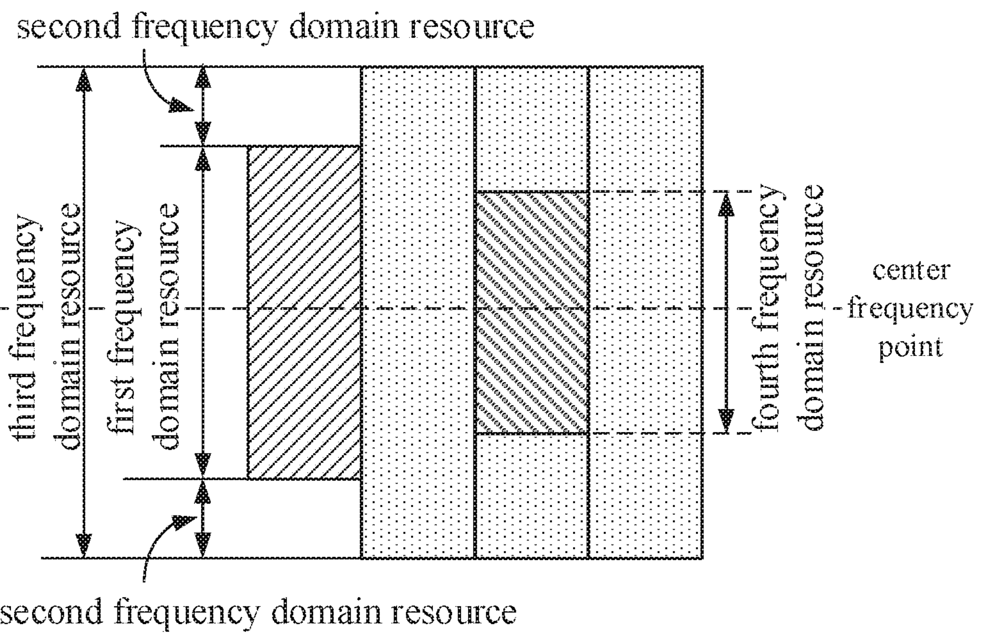
FIG. 7A is a schematic diagram showing a structure of a power saving signal according to an embodiment of the present disclosure.

As shown in FIG. 7A, the first sequence occupies a first frequency domain resource on the first time domain resource, the first channel occupies a third frequency domain resource on the second time domain resource and the fourth time domain resource and occupies a second frequency domain resource on the third time domain resource, and the second sequence occupies a fourth frequency domain resource on the third time domain resource.

Center frequency points of the first frequency domain resource, the third frequency domain resource and the fourth frequency domain resource are the same, the second frequency domain resource includes two equal frequency domain resources located on both sides of the fourth frequency domain resource, the third frequency domain resource includes the second frequency domain resource and the fourth frequency domain resource, and the width of the first frequency domain resource is less than or equal to the width of the third frequency domain resource.

According to embodiments, the first frequency domain resource may include 12+P physical resource blocks (PRBs), the third frequency domain resource may include 20 PRBs, the fourth frequency domain resource may include 12 PRBs, and the second frequency domain resource may include 8 PRBs.

When P=0, the size of the first frequency domain resource is 12 PRBs. Under such condition, the structure of the power saving signal is similar to the structure of the SSB, the first sequence is SSS, the second sequence is SSS, and the channel structure of the first channel is the same as that of the PBCH but the payloads are different. When P=0, the structure of the power saving signal is shown in FIG. 7B.

Figure 7B:
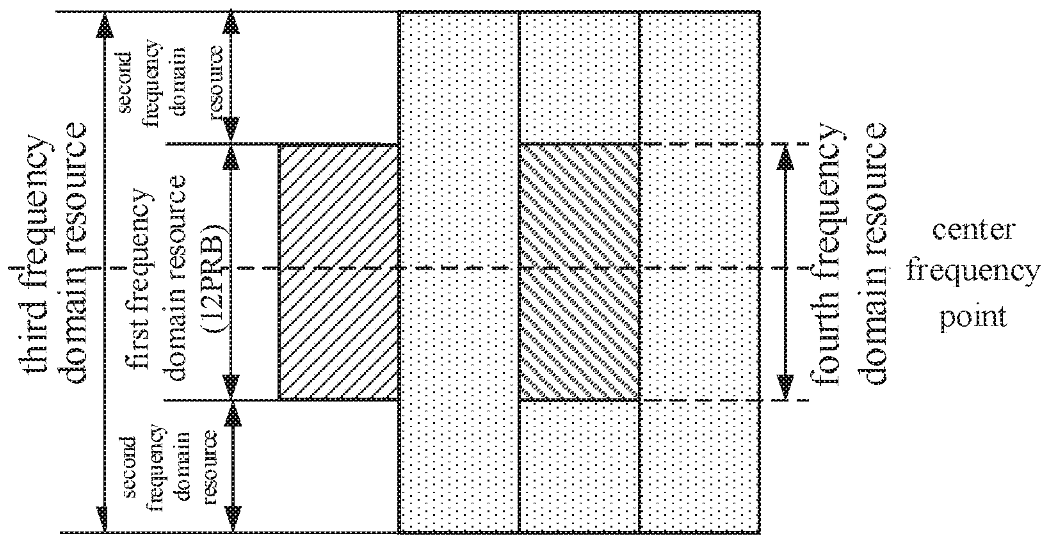
FIG. 7B is a schematic diagram showing a structure of a power saving signal according to an embodiment of the present disclosure.

Using the structure shown in FIG. 7B, the structure of the power saving signal is the same as the structure of SSB (the first sequence is equivalent to PSS, the second sequence is equivalent to SSS, the first channel is equivalent to PBCH but the contents of payloads are different), so as to achieve the minimum impact on the existing standards. In FIG. 7A, the width of the frequency domain resources occupied by the first sequence is increased by P, so that more different device identities (UE IDs) or device group identities can be indicated. For example, if the first sequence uses different cyclic shifts to indicate different UE IDs or device group identities, in the case of the same cyclic shift interval, the structure of FIG. 7A can provide more cyclic shifts to support indication of more UE IDs or device group identities Type 2 Structure The first sequence occupies a first time domain resource, the first channel occupies a second time domain resource, and the second sequence occupies a third time domain resource.

When the first channel needs to carry less information, in order to reduce the number of symbols occupied by the power saving signal, reduce the complexity in receiving the power saving signal by the terminal device and reduce the power consumption of the terminal device, the existing SSB structure can be appropriately tailored, for example, the first channel may no longer occupy the fourth time domain resource.

Figure 8A:
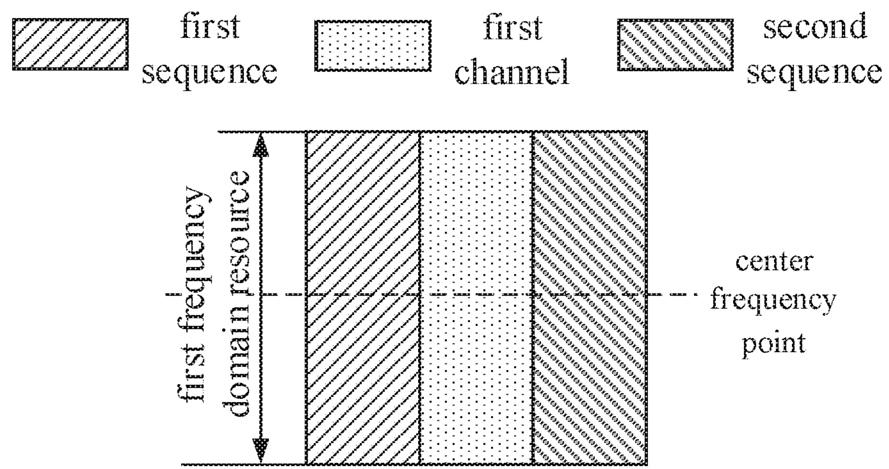
FIG. 8A is a schematic diagram showing a structure of a power saving signal according to an embodiment of the present disclosure.

When the first channel only occupies the second time domain resource, optionally, as shown in FIG. 8A, the first sequence occupies a first frequency domain resource on the first time domain resource, the first channel occupies the first frequency domain resource on the second time domain resource, and the second sequence occupies the first frequency domain resource on the third time domain resource.

Figure 8B:
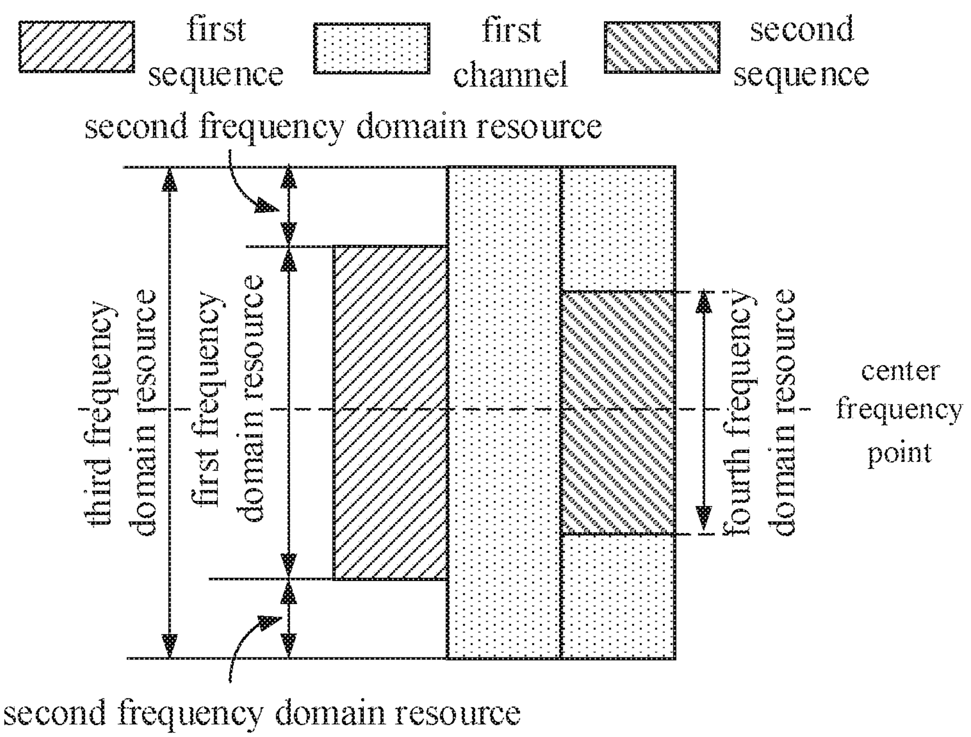
FIG. 8B is a schematic diagram showing a structure of a power saving signal according to an embodiment of the present disclosure.

When the first channel occupies the second time domain resource and the third time domain resource, optionally, as shown in FIG. 8B, the first sequence occupies the first frequency domain resource on the first time domain resource, the first channel occupies a third frequency domain resource on the second time domain resource and occupies the second frequency domain resource on the third time domain resource, and the second sequence occupies the fourth frequency domain resource on the third time domain resource.

Center frequency points of the first frequency domain resource, the third frequency domain resource and the fourth frequency domain resource are the same, the second frequency domain resource includes two equal frequency resources located on both sides of the fourth frequency domain resource, the third frequency domain resource includes the second frequency domain resource and the fourth frequency domain resource, and the width of the first frequency domain resource is less than or equal to the width of the third frequency domain resource.

According to embodiments, the first frequency domain resource may include 12+P physical resource blocks (PRBs), the third frequency domain resource may include 20 PRBs, the fourth frequency domain resource may include 12 PRBs, and the second frequency domain resource may include 8 PRBs.

Figure 8C:
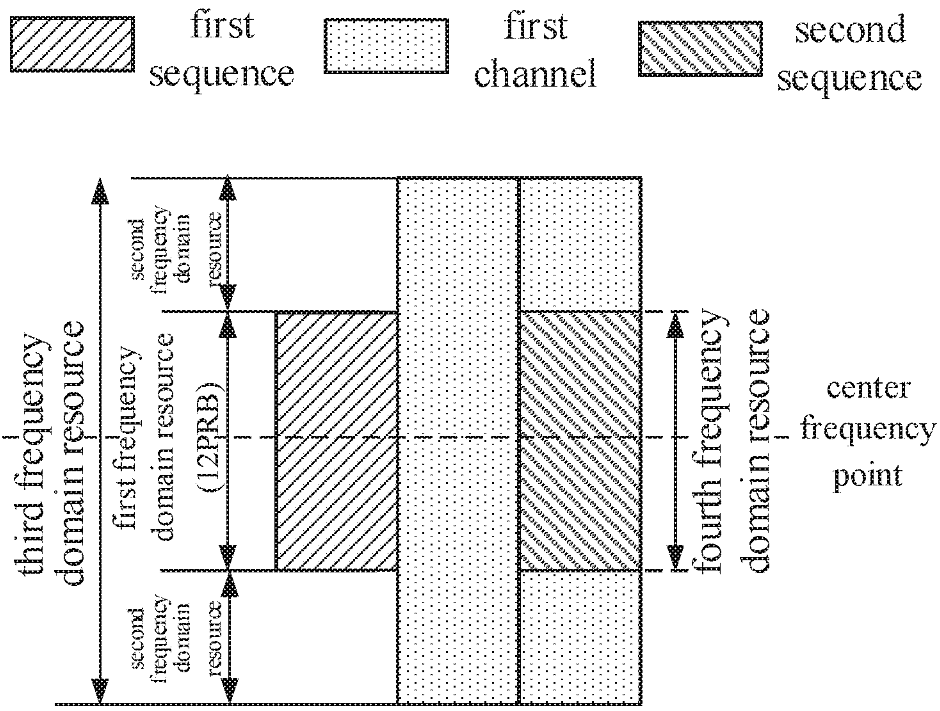
FIG. 8C is a schematic diagram showing a structure of a power saving signal according to an embodiment of the present disclosure.

When P=0, the size of the first frequency domain resource is 12 PRBs. Under such condition, the structure of the power saving signal is shown in FIG. 8C for example. Using the structure shown in FIG. 8C, the structure of the power saving signal is similar to the structure of the SSB, thereby imposing a lower impact on the existing standards. In FIG. 8B, the width of the frequency domain resources occupied by the first sequence is increased by P, so as to realize the indication of more different device identities (UE IDs) or device group identities. For example, if the first sequence uses different cyclic shifts to indicate different UE IDs or device group identities, in the case of the same cyclic shift interval, the structure of FIG. 8B can provide more cyclic shifts to support indication of more UE IDs or device group identities.

Type 3 Structure

The first sequence occupies a first time domain resource, the second sequence occupies a second time domain resource, and the first channel occupies a third time domain resource.

When the first channel needs to carry less information, in order to reduce the number of symbols occupied by the power saving signal, reduce the complexity in receiving the power saving signal by the terminal device and reduce the power consumption of the terminal device, the existing SSB structure can be appropriately tailored. For example, the first channel may no longer occupy the fourth time domain resource.

Figure 9A:
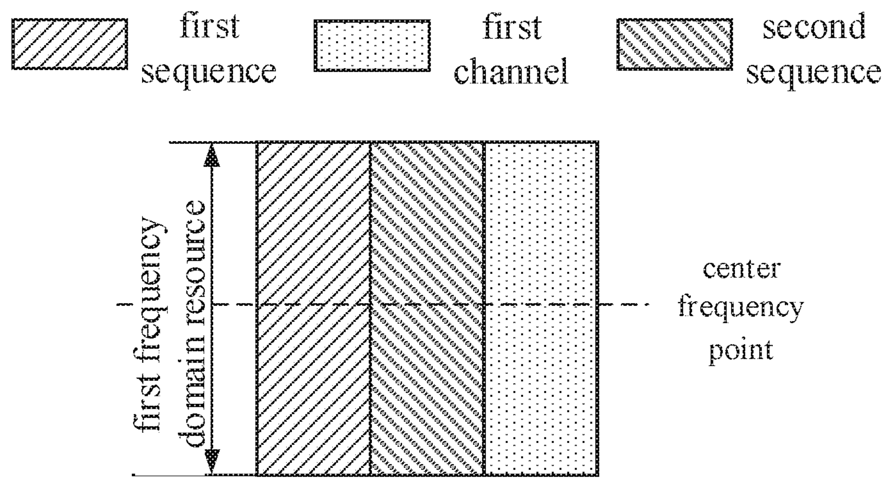
FIG. 9A is a schematic diagram showing a structure of a power saving signal according to an embodiment of the present disclosure.

When the first channel only occupies the second time domain resource, optionally, as shown in FIG. 9A, the first sequence occupies the first frequency domain resource on the first time domain resource, and the second sequence occupies the first frequency domain resource on the second time domain resource, and the first channel occupies the first frequency domain resource on the third time domain resource.

Figure 9B:
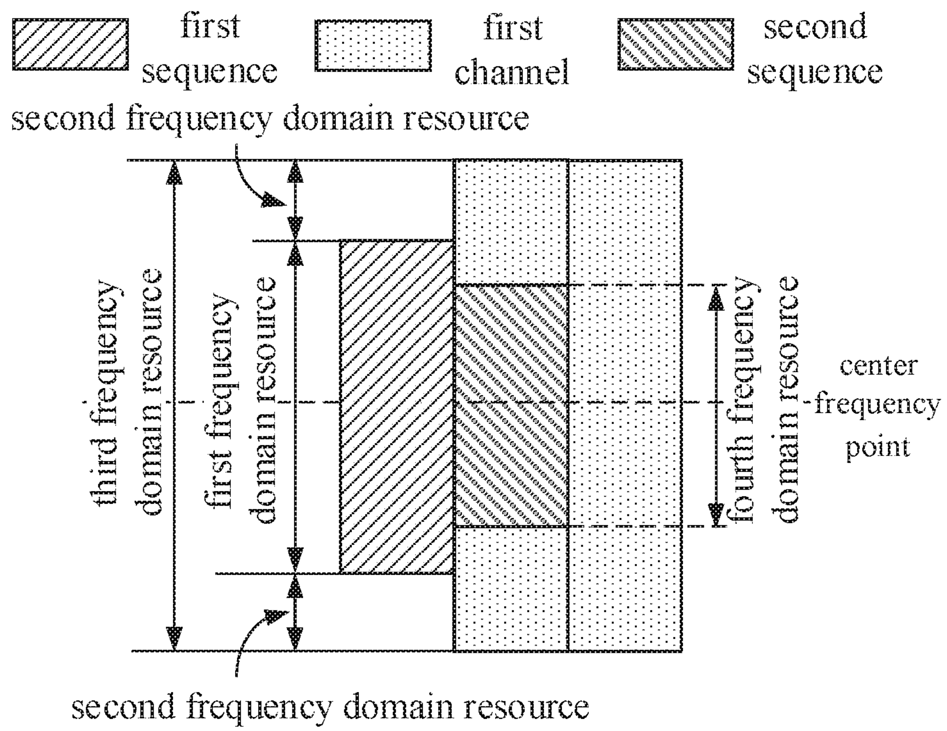
FIG. 9B is a schematic diagram showing a structure of a power saving signal according to an embodiment of the present disclosure.

When the first channel occupies the second time domain resource and the third time domain resource, optionally, as shown in FIG. 9B, the first sequence occupies the first frequency domain resource on the first time domain resource, the second sequence occupies a fourth frequency domain resource on the second time domain resource, and the first channel occupies a second frequency domain resource on the second time domain resource and occupies a third frequency domain resource on the third time domain resource.

Center frequency points of the first frequency domain resource, the third frequency domain resource and the fourth frequency domain resource are the same, the second frequency domain resource includes two equal frequency resources located on both sides of the fourth frequency domain resource, the third frequency domain resource includes the second frequency domain resource and the fourth frequency domain resource, and the width of the first frequency domain resource is less than or equal to the width of the third frequency domain resource.

According to embodiments, the first frequency domain resource may include 12+P physical resource blocks (PRBs), the third frequency domain resource may include 20 PRBs, the fourth frequency domain resource may include 12 PRBs, and the second frequency domain resource may include 8 PRBs.

Figure 9C:
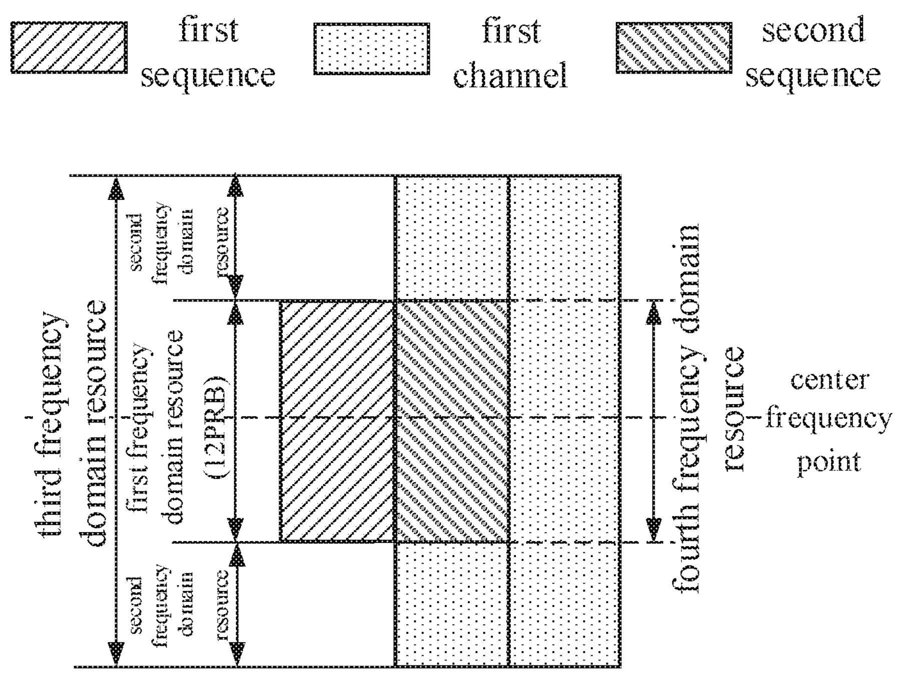
FIG. 9C is a schematic diagram showing a structure of a power saving signal according to an embodiment of the present disclosure.

When P=0, the size of the first frequency domain resource is 12 PRBs. Under such condition, the structure of the power saving signal is shown in FIG. 9C. Using the structure shown in FIG. 9C, the structure of the power saving signal is similar to that of the SSB, thereby imposing a lower impact on the existing standard. In FIG. 9B, the width of the frequency domain resources occupied by the first sequence is increased by P, so that more different device identities (UE IDs) or device group identities can be indicated. For example, if the first sequence uses different cyclic shifts to indicate different UE IDs or device group identities, then in the case of the same cyclic shift interval, the structure of FIG. 9B can provide more cyclic shifts to support indication of more UE IDs or device group identities.

As compared with the Type 2 structure, the transmission sequence of the second sequence and the first channel in Type 3 structure is adjusted.

In addition, it should be understood that in the embodiments of the present disclosure, the first sequence is first transmitted as an example for description, that is, the first sequence is transmitted on the first time domain resource. However, embodiments of the present disclosure do not make any restrictions on the transmission sequence of the first sequence, the second sequence, and the first channel. That is to say, embodiments of the present disclosure do not limit the size and order of the first time domain resource, the second time domain resource, the third time domain resource, and the fourth time domain resource.

Type 4 Structure

The first sequence occupies a first time domain resource, the second sequence occupies a second time domain resource, and the first channel occupies the second time domain resource.

In order to further reduce the complexity in receiving the power saving signal by the terminal device and reduce the power consumption of the terminal device, the number of symbols occupied by the power saving signal can be further reduced. For example, the time domain resources occupied by the power saving signal can be reduced to two symbols.

Figure 10A:
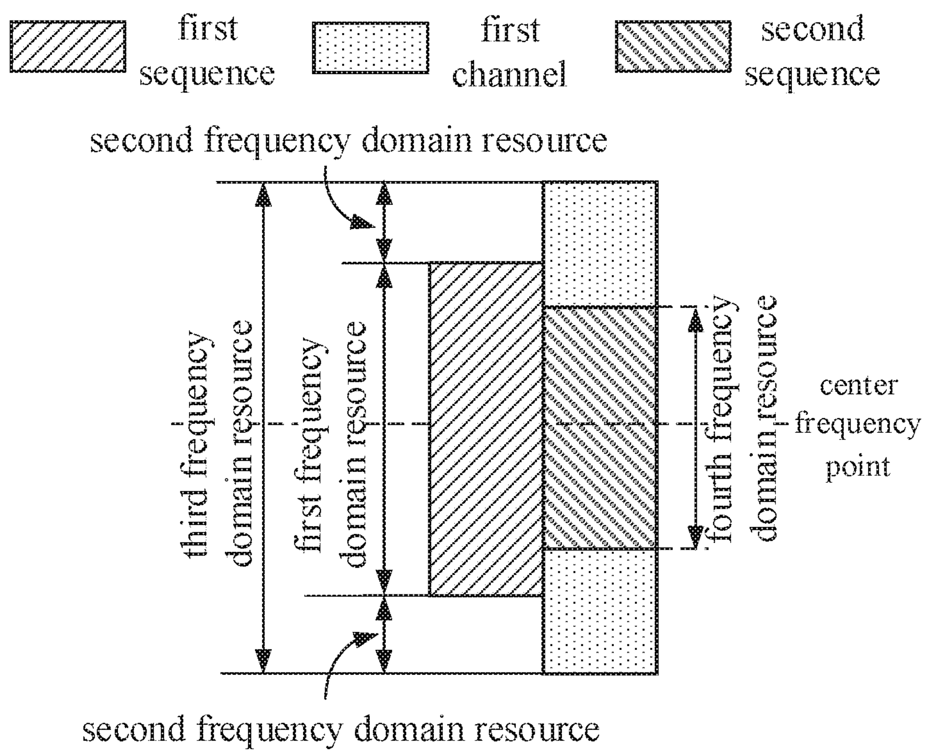
FIG. 10A is a schematic diagram showing a structure of a power saving signal according to an embodiment of the present disclosure.

When the first channel only occupies the second time domain resource, optionally, as shown in FIG. 10A, the first sequence occupies a first frequency domain resource on the first time domain resource, the first channel occupies a second frequency domain resource on the second time domain resource, and the second sequence occupies a fourth frequency domain resource on the second time domain resource.

Center frequency points of the first frequency domain resource and the fourth frequency domain resource are the same, the second frequency domain resource includes two equal frequency domain resources located on both sides of the fourth frequency domain resource, the sum of the fourth frequency domain resource and the second frequency domain resource is a third frequency domain resource, and the width of the first frequency domain resource is less than or equal to the width of the third frequency domain resource.

According to embodiments, the first frequency domain resource may include 12+P physical resource blocks (PRBs), the third frequency domain resource may include 20 PRBs, the fourth frequency domain resource may include 12 PRBs, and the second frequency domain resource may include 8 PRBs.

Figure 10B:
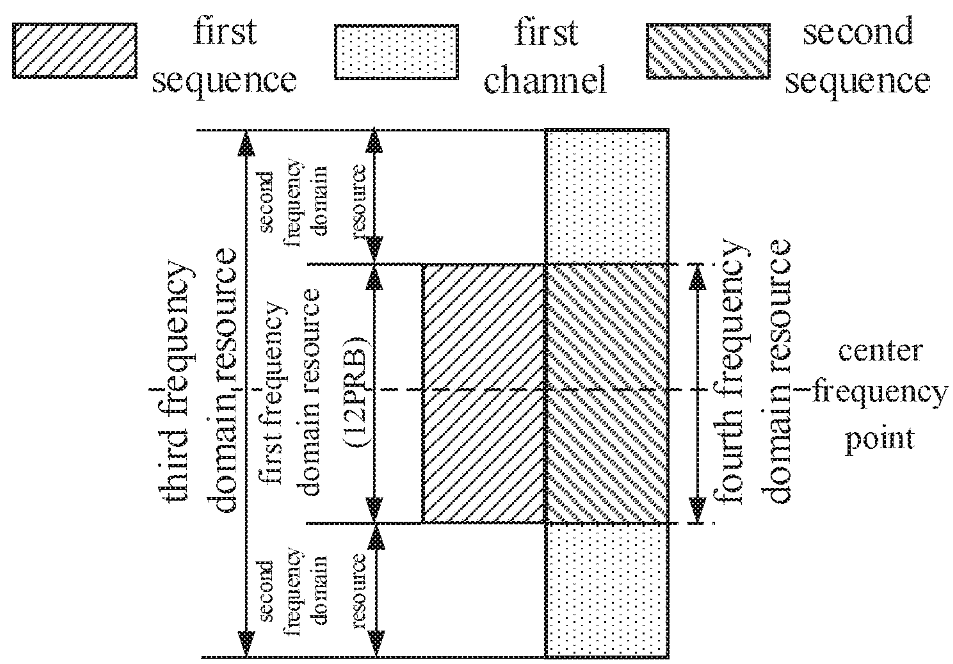
FIG. 10B is a schematic diagram showing a structure of a power saving signal according to an embodiment of the present disclosure.

When P=0, the size of the first frequency domain resource is 12 PRBs. Under such condition, the structure of the power saving signal is shown in FIG. 10B for example. Using the structure shown in FIG. 10A, the structure of the power saving signal is similar to the structure of the SSB, thereby imposing a lower impact on existing standards. In FIG. 10B, the width of the frequency domain resources occupied by the first sequence is increased by P, so as to realize the indication of more different device identities (UE IDs) or device group identities. For example, if the first sequence uses different cyclic shifts to indicate different UE IDs or device group identities, in the case of the same cyclic shift interval, the structure of FIG. 10B can provide more cyclic shifts to support indications of more UE IDs or device group identities.

Figure 10C:
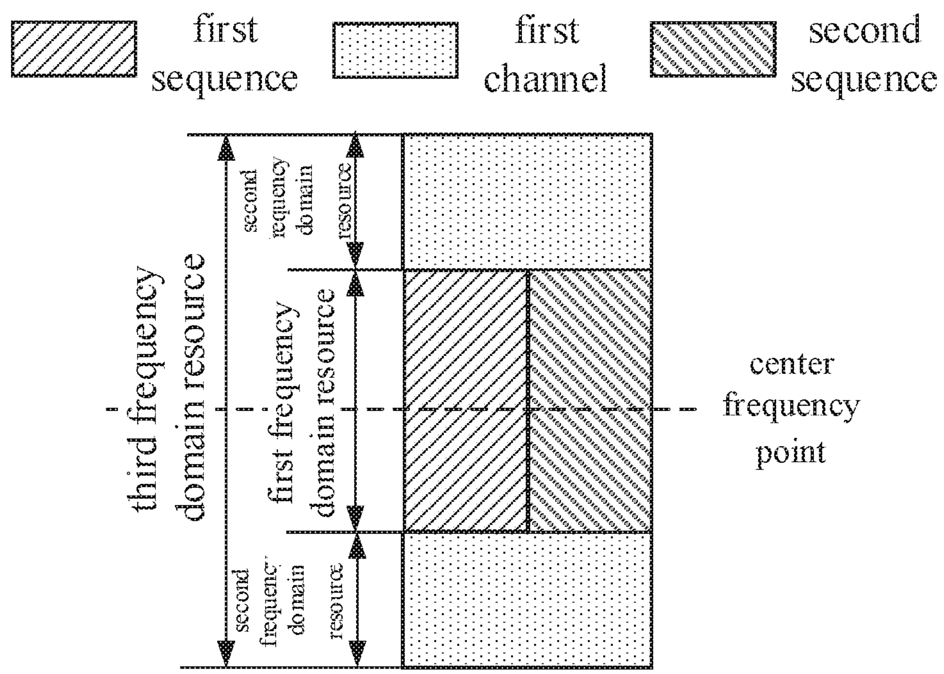
FIG. 10C is a schematic diagram showing a structure of a power saving signal according to an embodiment of the present disclosure.

When the first channel occupies the second time domain resource and the third time domain resource, optionally, as shown in FIG. 10C, the first sequence occupies the first frequency domain resource on the first time domain resource, the second sequence occupies the first frequency domain resource on the second time domain resource, and the first channel occupies the second frequency domain resource on both the first time domain resource and the second time domain resource.

The second frequency domain resource includes two equal frequency domain resources located on both sides of the first frequency domain resource, and the sum of the first frequency domain resource and the second frequency domain resource is a third frequency domain resource.

Type 5 Structure

In the power saving signal of the four types of structures described above, the power saving signal includes the first sequence, the second sequence, and the first channel. When the power saving signal only includes the first sequence and the first channel, the structure of the power saving signal may be the Type 5 structure.

According to embodiments, the first sequence occupies a first time domain resource, and the first channel occupies a second time domain resource.

In this case, the terminal device can determine whether the power saving signal is sent based on the detection of the first sequence; and the terminal device can implement time-frequency synchronization based on the first sequence and the pilot of the first channel, such as DMRS; the terminal device can implement measurement based on the DMRS of the first channel (it is required that the DMRS of the first channel is generated based on the cell ID). For example, the first channel may carry power saving indication information, which is used to instruct the terminal device to wake up or sleep in all or part of the time of the activation period in one or more subsequent DRX cycles. This design achieves a smaller resource overhead, thereby further reducing the detection complexity for the terminal device, and increasing the information carrying capacity of the power saving signal, and improving the flexibility of information carrying.

Figure 11A:
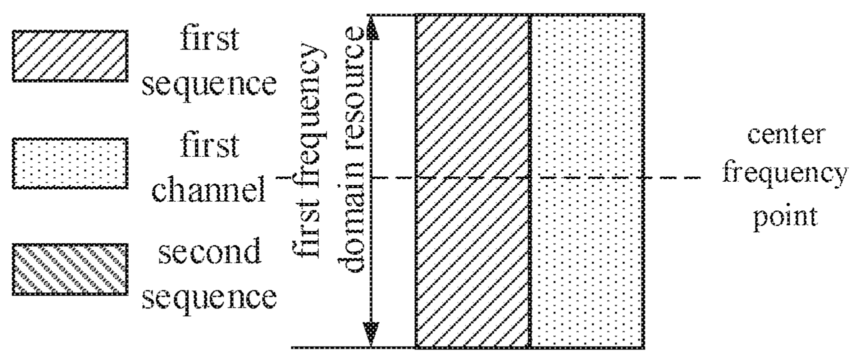
FIG. 11B is a schematic diagram showing a structure of a power saving signal according to an embodiment of the present disclosure.

When the first channel only occupies the second time domain resource, optionally, as shown in FIG. 11A, the first sequence occupies the first frequency domain resource on the first time domain resource, and the first channel occupies the first frequency domain resource on the second time domain resource.

Figure 11B:
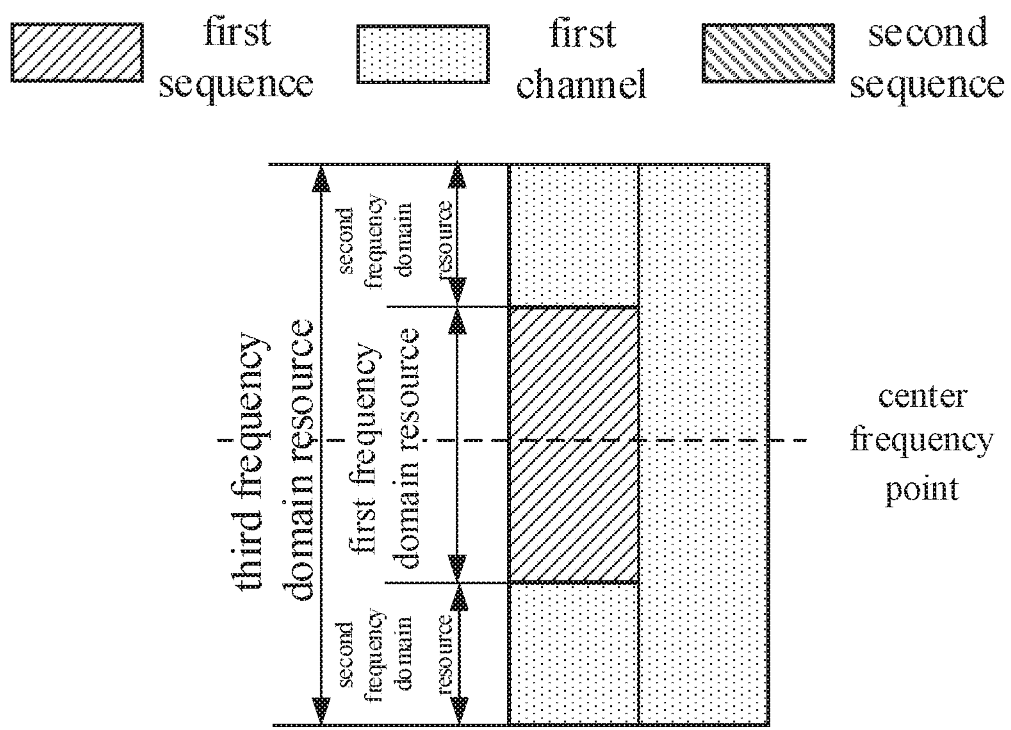

When the first channel occupies the first time domain resource and the second time domain resource, optionally, as shown in FIG. 11B, the first sequence occupies the first frequency domain resource on the first time domain resource, the first channel occupies a second frequency domain resource on the first time domain resource and occupies a third frequency domain resource on the second time domain resource.

Center frequency points of the first frequency domain resource and the third frequency domain resource are the same, the second frequency domain resource includes two equal frequency domain resources located on both sides of the first frequency domain resource, and the third frequency domain resource includes the first frequency domain resources and the second frequency domain resource.

It should be understood that the structures of the power saving signal described above are only examples, and embodiments of the present disclosure do not make any restrictions on the size and positions of the first frequency domain resource, the second frequency domain resource, the third frequency domain resource, and the fourth frequency domain resource. According to embodiments, the center frequency points of the first frequency domain resource, the third frequency domain resource and the fourth frequency domain resource are the same, the second frequency domain resource includes two equal frequency domain resources located on both sides of the fourth frequency domain resource, the third frequency domain resource includes the second frequency domain resource and the fourth frequency domain resource, and the width of the first frequency domain resource is less than or equal to the width of the third frequency domain resource. Accordingly, embodiments of the present disclosure can impose minimal impact on existing standards.

The present disclosure is not limited to the above described embodiments. For example, the size of the first frequency domain resource and/or the fourth frequency domain resource may also be less than 12 PRBs; for example, the size of the second frequency domain resource may also be less than 8 PRBs (for example, the second frequency domain resource only includes 4 PRBs on one side of the fourth frequency domain resource); for another example, the size of the third frequency domain resource may also be greater than 20 PRBs or less than 20 PRBs. The size of these frequency domain resources can be adjusted according to the size of the actual transmitted contents.

It should be understood that in various embodiments of the present disclosure, the sequence numbers of the foregoing processes does not mean the order of executions. The execution order of processes should be determined by their functions and internal logic, and the described execution order should not be construed as constituting any limitation on the scope of the present disclosure.

It should also be understood that various embodiments and/or the technical features in embodiments can be combined with each other arbitrarily if the embodiments or technical features do not conflict with each other, and the technical solutions obtained after the combination should also fall within the protection scope of the present disclosure.

The signal transmission method according to embodiments of the present disclosure is described in detail above. The device embodiments of the present disclosure will be described below with reference to FIG. 12 to FIG. 15. The technical features described in the method embodiments are applicable to the following device embodiments.

Figure 12:
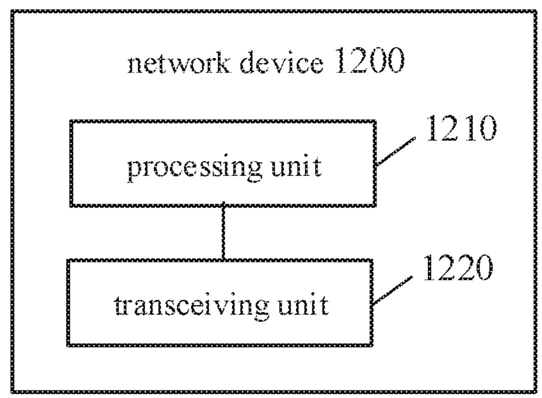
FIG. 12 is a schematic block diagram of a network device according to an embodiment of the present disclosure.

FIG. 12 is a schematic block diagram of a network device 1200 according to an embodiment of the present disclosure. As shown in FIG. 12, the network device 1200 includes a processing unit 1210 and a transceiving unit 1220.

The processing unit 1210 is configured to generate a power saving signal to a terminal device. The power saving signal includes a first sequence, the first sequence is used to indicate at least part of identification information related to the terminal device, and/or the first sequence is used for the terminal device to perform time-frequency synchronization.

The transceiving unit 1220 is configured to send the power saving signal generated by the processing unit 1210 to the terminal device.

The identification information related to the terminal device includes: an identity of a device group which the terminal device belongs to, a device identity of the terminal device, and Physical Cell Identification (PCI) information of a cell where the terminal device resides.

In embodiments of the present disclosure, the power saving signal includes the first sequence, and the design of the first sequence is related to specific information of the terminal device, such as the device group to which the terminal device belongs, the device identity of the terminal device, or the PCI of the cell where the terminal device resides. Terminal devices with different attributes can effectively identify their own power saving signals, and perform corresponding operations based on the power saving signals. The first sequence can also have functions such as time-frequency synchronization or measurement, greatly improving the functions of power saving signal, and further reducing the power consumption of terminal device.

According to embodiments, the first sequence is used to indicate the identity of the device group which the terminal device belongs to;

there is a one-to-one correspondence between M different device groups and M first sequences, and the first sequence is a first sequence among the M first sequences which corresponds to the device group which the terminal device belongs to, and M is a positive integer.

According to embodiments, cyclic shifts of the M first sequences are different, initial values of the M first sequences are different, scramble codes used for scrambling the M first sequences are different, positions of time domain resources for transmitting the M first sequences are different, or the M first sequences are M orthogonal sequences.

According to embodiments, the first sequence is used to indicate the device identity of the terminal device;

there is a one-to-one correspondence between N different device identities and N first sequences, and the first sequence is a first sequences among the N first sequences which corresponds to the device identity of the terminal device, and N is a positive integer.

According to embodiments, cyclic shifts of the N first sequences are different, initial values of the N first sequences are different, scramble codes used for scrambling the N first sequences are different, positions of time domain resources for transmitting the N first sequences are different, or the N first sequences are N orthogonal sequences.

According to embodiments, the first sequence is used to indicate the PCI information of the cell where the terminal device resides;

there is a one-to-one correspondence between K PCI information and K first sequences, and the first sequence is a first sequence among the K first sequences which corresponds to the PCI information of the terminal device, and K is a positive integer.

According to embodiments, cyclic shifts of the K first sequences are different, initial values of the K first sequences are different, scramble codes for scrambling the K first sequences are different, positions of the time domain resources for transmitting the K first sequences are different, or the K first sequences are K orthogonal sequences.

According to embodiments, the first sequence is used to indicate the identity of the device group which the terminal device belongs to and the PCI information of the cell where the terminal device resides, there is a one-to-one correspondence between M×K different identification information and M×K first sequences, and the first sequence is a first sequence among the M×K first sequences which corresponds to the identification information of the terminal device.

According to embodiments, cyclic shifts of the M×K first sequences are different, initial values of the M×K first sequences are different, scramble codes used for scrambling the M×K first sequences are different, positions of time domain resources for transmitting the M×K first sequences are different, or the M×K first sequences are M×K orthogonal sequences.

According to embodiments, the first sequence is used to indicate the device identity of the terminal device and PCI information of the cell where the terminal device resides;

wherein there is a one-to-one correspondence between N×K different identification information and N×K first sequences, and the first sequence is a first sequence among the N×K first sequences which corresponds to the identification information of the terminal device.

According to embodiments, cyclic shifts of the N×K first sequences are different, initial values of the N×K first sequences are different, scramble codes used for scrambling the N×K first sequences are different, positions of time domain resources used for transmitting the N×K first sequences are different, or the N×K first sequences are N×K orthogonal sequences.

According to embodiments, the PCI information of the cell where the terminal device resides includes an identity of a PCI group which the PCI of the cell where the terminal device resides in belongs to, or the PCI of the cell where the terminal device resides, wherein PCIs with a same value of PCI mod K belong to a same PCI group.

According to embodiments, the first sequence is a ZC sequence, an M sequence or a PN sequence.

According to embodiments, when the first sequence is used to indicate the PCI information of the cell where the terminal device resides, the first sequence is further used for the terminal device to perform Radio Resource Management (RRM) measurement.

According to embodiments, the power saving signal further includes a first channel, and the first channel is used to indicate the identity of the device group which the terminal device belongs to or the device identity of the terminal device.

According to embodiments, when the first sequence is not used to indicate the identity of the device group which the terminal device belongs to or the device identity of the terminal device, the first channel is further used to indicate the identity of the device group which the terminal device belongs to or the device identity of the terminal device.

According to embodiments, the first channel is further used to indicate Bandwidth Part (BWP) information to be used by the terminal device and/or configuration information of Physical Downlink Control Channel (PDCCH) search space.

According to embodiments, the first sequence occupies a first time domain resource, the first channel occupies a second time domain resource, and the second time domain resource is located after the first time domain resource.

According to embodiments, the first sequence occupies a first frequency domain resource on the first time domain resource, and the first channel occupies the first frequency domain resource on the second time domain resource.

According to embodiments, the first channel also occupies the first time domain resource. The first sequence occupies a first frequency domain resource on the first time domain resource, and the first channel occupies a second frequency domain resource on the first time domain resource and occupies a third frequency domain resource on the second time domain resource. Center frequency points of the first frequency domain resource and the third frequency domain resource are the same, the second frequency domain resource includes two equal frequency domain resources located on both sides of the first frequency domain resource, and the third frequency domain resource includes the first frequency domain resource and the second frequency domain resource.

According to embodiments, the power saving signal further includes a second sequence, and the second sequence is used to indicate at least part of identification information related to the terminal device.

According to embodiments, when the first sequence and/or the first channel are not used to indicate the identity of the device group which the terminal device belongs to or the device identity of the terminal device, the second sequence is used to indicate the identity of the device group which the terminal device belongs to or the device identity of the terminal device;

when the first sequence is not used to indicate the PCI information of the cell where the terminal device resides, the second sequence is used to indicate the PCI information of the cell where the terminal device resides; and when the first sequence is used to indicate a part of the PCI information of the cell where the terminal device resides, the second sequence is used to indicate the remaining part of the PCI information of the cell where the terminal device resides.

According to embodiments, the second sequence is a ZC sequence, an M sequence or a PN sequence.

According to embodiments, the first sequence occupies a first time domain resource, the first channel occupies a second time domain resource, a third time domain resource and a fourth time domain resource, and the second sequence occupies the third time domain resource. The first time domain resource, the second time domain resource, the third time domain resource and the fourth time domain resource are sequentially arranged from front to back in a time domain.

According to embodiments, the first sequence occupies a first frequency domain resource on the first time domain resource, the first channel occupies a third frequency domain resource on the second time domain resource and the fourth time domain resource and occupies a second frequency domain resource on the third time domain resource, and the second sequence occupies a fourth frequency domain resource on the third time domain resource. Center frequency points of the first frequency domain resource, the third frequency domain resource and the fourth frequency domain resource are the same, the second frequency domain resource includes two equal frequency domain resources located on both sides of the fourth frequency domain resource, the third frequency domain resource includes the second frequency domain resource and the fourth frequency domain resource, and a width of the first frequency domain resource is less than or equal to a width of the third frequency domain resource.

According to embodiments, the first sequence occupies a first time domain resource, the first channel occupies a second time domain resource, and the second sequence occupies a third time domain resource. The first time domain resource, the second time domain resource, and the third time domain resource are sequentially from front to back in the time domain.

According to embodiments, the first sequence occupies a first frequency domain resource on the first time domain resource, the first channel occupies the first frequency domain resource on the second time domain resource, and the second sequence occupies the first frequency domain resource on the third time domain resource.

According to embodiments, the first channel also occupies the third time domain resource. The first sequence occupies a first frequency domain resource on the first time domain resource, the first channel occupies a third frequency domain resource on the second time domain resource and occupies a second frequency domain resource on the third time domain resource, and the second sequence occupies a fourth frequency domain resource on the third time domain resource. Center frequency points of the first frequency domain resource, the third frequency domain resource and the fourth frequency domain resource are the same, the second frequency domain resource includes two equal frequency domain resources located on both sides of the fourth frequency domain resource, the third frequency domain resource includes the second frequency domain resource and the fourth frequency domain resource, and a width of the first frequency domain resource is less than or equal to a width of the third frequency domain resource.

According to embodiments, the first sequence occupies a first time domain resource, the second sequence occupies a second time domain resource, and the first channel occupies a third time domain resource. The first time domain resource, the second time domain resource and the third time domain resource are arranged sequentially from front to back in a time domain.

According to embodiments, the first sequence occupies a first frequency domain resource on the first time domain resource, the second sequence occupies the first frequency domain resource on the second time domain resource, and the first channel occupies the first frequency domain resource on the third time domain resource.

According to embodiments, the first channel also occupies the second time domain resource. The first sequence occupies a first frequency domain resource on the first time domain resource, the second sequence occupies a fourth frequency domain resource on the second time domain resource, and the first channel occupies a second frequency domain resource on the second time domain resource and occupies a third frequency domain resource on the third time domain resource. Center frequency points of the first frequency domain resource, the third frequency domain resource and the fourth frequency domain resource are the same, the second frequency domain resource includes two equal frequency domain resources located on both sides of the fourth frequency domain resource, the third frequency domain resource includes the second frequency domain resource and the fourth frequency domain resource, and a width of the first frequency domain resource is less than or equal to a width of the third frequency domain resource.

According to embodiments, the first sequence occupies a first time domain resource, the second sequence occupies a second time domain resource, the first channel occupies the second time domain resource, and the second time domain resource is located after the first time domain resource.

According to embodiments, the first sequence occupies a first frequency domain resource on the first time domain resource, the first channel occupies a second frequency domain resource on the second time domain resource, and the second sequence occupies a fourth frequency domain resource on the second time domain resource. Center frequency points of the first frequency domain resource and the fourth frequency domain resource are the same, the second frequency domain resource includes two equal frequency domain resources located on both sides of the fourth frequency domain resource, a sum of the fourth frequency domain resource and the second frequency domain resource is a third frequency domain resource, and a width of the first frequency domain resource is less than or equal to a width of the third frequency domain resource.

According to embodiments, the first channel also occupies the first time domain resource. The first sequence occupies a first frequency domain resource on the first time domain resource, the second sequence occupies the first frequency domain resource on the second time domain resource, and the first channel occupies a second frequency domain resource on both the first time domain resource and the second time domain resource. The second frequency domain resource includes two equal frequency domain resources located on both sides of the first frequency domain resource, and a sum of the first frequency domain resource and the second frequency domain resource is a third frequency domain resource.

According to embodiments, the first frequency domain resource includes 12+P Physical Resource Blocks (PRBs), the third frequency domain resource includes 20 PRBs, the fourth frequency domain resource includes 12 PRBs, and each of the two equal frequency domain resources located on both sides of the fourth frequency domain resource included in the second frequency domain resource includes 4 PRBs, P being a natural number.

According to embodiments, the first sequence is a Primary Synchronization Signal (PSS), the second sequence is a Secondary Synchronization Signal (SSS), a channel structure of the first channel is same as a channel structure of Physical Broadcast Channel (PBCH), and a payload carried by the first channel is different from a payload carried by the PBCH.

It should be understood that the network device 1200 can perform the corresponding operations performed by the network device in the foregoing method 300, and for the sake of brevity, details are not described herein again.

Figure 13:
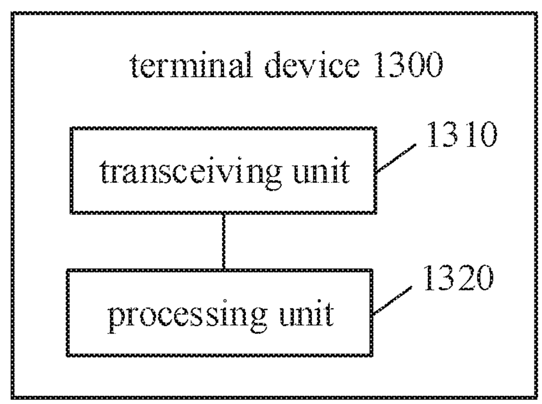
FIG. 13 is a schematic block diagram of a terminal device according to an embodiment of the present disclosure.

FIG. 13 is a schematic block diagram of a terminal device 1300 according to an embodiment of the present disclosure. As shown in FIG. 13, the terminal device 1300 includes a transceiving unit 1310 and a processing unit 1320.

The transceiving unit 1310 is configured to receive a power saving signal sent from a network device. The power saving signal includes a first sequence, the first sequence is used to indicate at least part of identification information related to the terminal device, and/or the first sequence is used for the terminal device to perform time-frequency synchronization.

The processing unit 1320 is configured to perform a power saving operation according to the power saving signal received by the transceiving unit 1310.

The identification information related to the terminal device includes: an identity of a device group which the terminal device belongs to, a device identity of the terminal device, and Physical Cell Identification (PCI) information of a cell where the terminal device resides.

In embodiments of the present disclosure, the power saving signal includes the first sequence, and the design of the first sequence is related to specific information of the terminal device, such as the device group to which the terminal device belongs, the device identity of the terminal device, or the PCI of the cell where the terminal device resides. Terminal devices with different attributes can effectively identify their own power saving signals, and perform corresponding operations based on the power saving signals. The first sequence can also have functions such as time-frequency synchronization or measurement, which greatly improves the functions of power saving signal, and the power consumption of terminal device is further reduced.

According to embodiments, the first sequence is used to indicate the identity of the device group which the terminal device belongs to;

there is a one-to-one correspondence between M different device groups and M first sequences, and the first sequence is a first sequence among the M first sequences which corresponds to the device group which the terminal device belongs to, and M is a positive integer.

According to embodiments, cyclic shifts of the M first sequences are different, initial values of the M first sequences are different, scramble codes used for scrambling the M first sequences are different, positions of time domain resources for transmitting the M first sequences are different, or the M first sequences are M orthogonal sequences.

According to embodiments, the first sequence is used to indicate the device identity of the terminal device;

there is a one-to-one correspondence between N different device identities and N first sequences, and the first sequence is a first sequences among the N first sequences which corresponds to the device identity of the terminal device, and N is a positive integer.

According to embodiments, cyclic shifts of the N first sequences are different, initial values of the N first sequences are different, scramble codes used for scrambling the N first sequences are different, positions of time domain resources for transmitting the N first sequences are different, or the N first sequences are N orthogonal sequences.

According to embodiments, the first sequence is used to indicate the PCI information of the cell where the terminal device resides;

there is a one-to-one correspondence between K PCI information and K first sequences, and the first sequence is a first sequence among the K first sequences which corresponds to the PCI information of the terminal device, and K is a positive integer.

According to embodiments, cyclic shifts of the K first sequences are different, initial values of the K first sequences are different, scramble codes for scrambling the K first sequences are different, positions of the time domain resources for transmitting the K first sequences are different, or the K first sequences are K orthogonal sequences.

According to embodiments, the first sequence is used to indicate the identity of the device group which the terminal device belongs to and the PCI information of the cell where the terminal device resides, there is a one-to-one correspondence between M×K different identification information and M×K first sequences, and the first sequence is a first sequence among the M×K first sequences which corresponds to the identification information of the terminal device.

According to embodiments, cyclic shifts of the M×K first sequences are different, initial values of the M×K first sequences are different, scramble codes used for scrambling the M×K first sequences are different, positions of time domain resources for transmitting the M×K first sequences are different, or the M×K first sequences are M×K orthogonal sequences.

According to embodiments, the first sequence is used to indicate the device identity of the terminal device and PCI information of the cell where the terminal device resides;

there is a one-to-one correspondence between N×K different identification information and N×K first sequences, and the first sequence is a first sequence among the N×K first sequences which corresponds to the identification information of the terminal device.

According to embodiments, cyclic shifts of the N×K first sequences are different, initial values of the N K first sequences are different, scramble codes used for scrambling the N×K first sequences are different, positions of time domain resources used for transmitting the N×K first sequences are different, or the N×K first sequences are N×K orthogonal sequences.

According to embodiments, the PCI information of the cell where the terminal device resides includes an identity of a PCI group which the PCI of the cell where the terminal device resides in belongs to, or the PCI of the cell where the terminal device resides, wherein PCIs with a same value of PCI mod K belong to a same PCI group.

According to embodiments, the first sequence is a ZC sequence, an M sequence or a PN sequence.

According to embodiments, when the first sequence is used to indicate the PCI information of the cell where the terminal device resides, the first sequence is further used for the terminal device to perform Radio Resource Management (RRM) measurement.

According to embodiments, the power saving signal further includes a first channel, and the first channel is used to indicate the identity of the device group which the terminal device belongs to or the device identity of the terminal device.

According to embodiments, when the first sequence is not used to indicate the identity of the device group which the terminal device belongs to or the device identity of the terminal device, the first channel is further used to indicate the identity of the device group which the terminal device belongs to or the device identity of the terminal device.

According to embodiments, the first channel is further used to indicate Bandwidth Part (BWP) information to be used by the terminal device and/or configuration information of Physical Downlink Control Channel (PDCCH) search space.

According to embodiments, the first sequence occupies a first time domain resource, the first channel occupies a second time domain resource, and the second time domain resource is located after the first time domain resource.

According to embodiments, the first sequence occupies a first frequency domain resource on the first time domain resource, and the first channel occupies the first frequency domain resource on the second time domain resource.

According to embodiments, the first channel also occupies the first time domain resource. The first sequence occupies a first frequency domain resource on the first time domain resource, and the first channel occupies a second frequency domain resource on the first time domain resource and occupies a third frequency domain resource on the second time domain resource. Center frequency points of the first frequency domain resource and the third frequency domain resource are the same, the second frequency domain resource includes two equal frequency domain resources located on both sides of the first frequency domain resource, and the third frequency domain resource includes the first frequency domain resource and the second frequency domain resource.

According to embodiments, the power saving signal further includes a second sequence, and the second sequence is used to indicate at least part of identification information related to the terminal device.

According to embodiments, when the first sequence and/or the first channel are not used to indicate the identity of the device group which the terminal device belongs to or the device identity of the terminal device, the second sequence is used to indicate the identity of the device group which the terminal device belongs to or the device identity of the terminal device;

when the first sequence is not used to indicate the PCI information of the cell where the terminal device resides, the second sequence is used to indicate the PCI information of the cell where the terminal device resides; and when the first sequence is used to indicate a part of the PCI information of the cell where the terminal device resides, the second sequence is used to indicate the remaining part of the PCI information of the cell where the terminal device resides.

According to embodiments, the second sequence is a ZC sequence, an M sequence or a PN sequence.

According to embodiments, the first sequence occupies a first time domain resource, the first channel occupies a second time domain resource, a third time domain resource and a fourth time domain resource, and the second sequence occupies the third time domain resource. The first time domain resource, the second time domain resource, the third time domain resource and the fourth time domain resource are sequentially arranged from front to back in a time domain.

According to embodiments, the first sequence occupies a first frequency domain resource on the first time domain resource, the first channel occupies a third frequency domain resource on the second time domain resource and the fourth time domain resource and occupies a second frequency domain resource on the third time domain resource, and the second sequence occupies a fourth frequency domain resource on the third time domain resource. Center frequency points of the first frequency domain resource, the third frequency domain resource and the fourth frequency domain resource are the same, the second frequency domain resource includes two equal frequency domain resources located on both sides of the fourth frequency domain resource, the third frequency domain resource includes the second frequency domain resource and the fourth frequency domain resource, and a width of the first frequency domain resource is less than or equal to a width of the third frequency domain resource.

According to embodiments, the first sequence occupies a first time domain resource, the first channel occupies a second time domain resource, and the second sequence occupies a third time domain resource. The first time domain resource, the second time domain resource, and the third time domain resource are sequentially from front to back in the time domain.

According to embodiments, the first sequence occupies a first frequency domain resource on the first time domain resource, the first channel occupies the first frequency domain resource on the second time domain resource, and the second sequence occupies the first frequency domain resource on the third time domain resource.

According to embodiments, the first channel also occupies the third time domain resource. The first sequence occupies a first frequency domain resource on the first time domain resource, the first channel occupies a third frequency domain resource on the second time domain resource and occupies a second frequency domain resource on the third time domain resource, and the second sequence occupies a fourth frequency domain resource on the third time domain resource. Center frequency points of the first frequency domain resource, the third frequency domain resource and the fourth frequency domain resource are the same, the second frequency domain resource includes two equal frequency domain resources located on both sides of the fourth frequency domain resource, the third frequency domain resource includes the second frequency domain resource and the fourth frequency domain resource, and a width of the first frequency domain resource is less than or equal to a width of the third frequency domain resource.

According to embodiments, the first sequence occupies a first time domain resource, the second sequence occupies a second time domain resource, and the first channel occupies a third time domain resource. The first time domain resource, the second time domain resource and the third time domain resource are arranged sequentially from front to back in a time domain.

According to embodiments, the first sequence occupies a first frequency domain resource on the first time domain resource, the second sequence occupies the first frequency domain resource on the second time domain resource, and the first channel occupies the first frequency domain resource on the third time domain resource.

According to embodiments, the first channel also occupies the second time domain resource. The first sequence occupies a first frequency domain resource on the first time domain resource, the second sequence occupies a fourth frequency domain resource on the second time domain resource, and the first channel occupies a second frequency domain resource on the second time domain resource and occupies a third frequency domain resource on the third time domain resource. Center frequency points of the first frequency domain resource, the third frequency domain resource and the fourth frequency domain resource are the same, the second frequency domain resource includes two equal frequency domain resources located on both sides of the fourth frequency domain resource, the third frequency domain resource includes the second frequency domain resource and the fourth frequency domain resource, and a width of the first frequency domain resource is less than or equal to a width of the third frequency domain resource.

According to embodiments, the first sequence occupies a first time domain resource, the second sequence occupies a second time domain resource, the first channel occupies the second time domain resource, and the second time domain resource is located after the first time domain resource.

According to embodiments, the first sequence occupies a first frequency domain resource on the first time domain resource, the first channel occupies a second frequency domain resource on the second time domain resource, and the second sequence occupies a fourth frequency domain resource on the second time domain resource. Center frequency points of the first frequency domain resource and the fourth frequency domain resource are the same, the second frequency domain resource includes two equal frequency domain resources located on both sides of the fourth frequency domain resource, a sum of the fourth frequency domain resource and the second frequency domain resource is a third frequency domain resource, and a width of the first frequency domain resource is less than or equal to a width of the third frequency domain resource.

According to embodiments, the first channel also occupies the first time domain resource. The first sequence occupies a first frequency domain resource on the first time domain resource, the second sequence occupies the first frequency domain resource on the second time domain resource, and the first channel occupies a second frequency domain resource on both the first time domain resource and the second time domain resource. The second frequency domain resource includes two equal frequency domain resources located on both sides of the first frequency domain resource, and a sum of the first frequency domain resource and the second frequency domain resource is a third frequency domain resource.

According to embodiments, the first frequency domain resource includes 12+P Physical Resource Blocks (PRBs), the third frequency domain resource includes 20 PRBs, the fourth frequency domain resource includes 12 PRBs, and each of the two equal frequency domain resources located on both sides of the fourth frequency domain resource included in the second frequency domain resource includes 4 PRBs, P being a natural number.

According to embodiments, the first sequence is a Primary Synchronization Signal (PSS), the second sequence is a Secondary Synchronization Signal (SSS), a channel structure of the first channel is same as a channel structure of Physical Broadcast Channel (PBCH), and a payload carried by the first channel is different from a payload carried by the PBCH.

It should be understood that the terminal device 1300 can perform the corresponding operations performed by the terminal device in the foregoing method 300, and for the sake of brevity, details are not described herein again.

Figure 14:
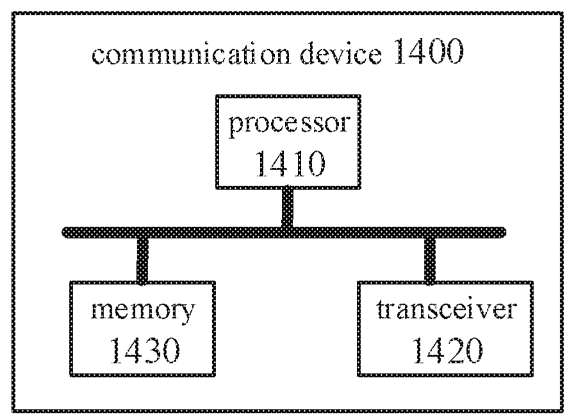
FIG. 14 is a schematic structural diagram of a communication device according to an embodiment of the present disclosure.

FIG. 14 is a schematic structural diagram of a communication device 1400 according to an embodiment of the present disclosure. As shown in FIG. 14, the communication device includes a processor 1410, a transceiver 1420, and a memory 1430. The processor 1410, the transceiver 1420, and the memory 1430 communicate with each other through an internal connection path. The memory 1430 is configured to store instructions, and the processor 1410 is configured to execute instructions stored in the memory 1430 to control the transceiver 1420 to receive signals or send signals.

According to embodiments, the processor 1410 may call the program codes stored in the memory 1430 to perform the corresponding operations of the terminal device in the method 300. For brevity, details are not described herein again.

According to embodiments, the processor 1410 may call the program codes stored in the memory 1430 to perform the corresponding operations performed by the network device in the method 300. For brevity, details are not described herein again.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SL-DRAM)), or Direct Rambus RAM (DR RAM). It should be noted that the memory in the systems and methods described in the present disclosure is intended to include but not limited to these and any other suitable types of memory.

Figure 15:
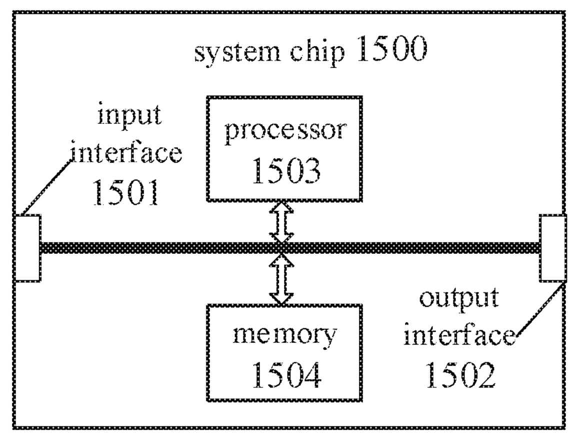
FIG. 15 is a schematic structural diagram of a system chip according to an embodiment of the present disclosure.

FIG. 15 is a schematic structural diagram of a system chip according to an embodiment of the present disclosure. The system chip 1500 in FIG. 15 includes an input interface 1501, an output interface 1502, at least one processor 1503, and a memory 1504. The input interface 1501, the output interface 1502, the processor 1503, and the memory 1504 are connected to each other through internal connection paths. The processor 1503 is configured to execute codes in the memory 1504.

According to embodiments, when the codes are executed, the processor 1503 may perform the corresponding operations performed by the terminal device in the method 300. For brevity, repeated descriptions are omitted here.

According to embodiments, when the codes are executed, the processor 1503 may perform the corresponding operations performed by the network device in the method 300. For brevity, repeated descriptions are omitted here.

It should be understood that in the embodiment of the present disclosure, "B corresponding to A" means that B is associated with A, or B can be determined according to A. However, it should also be understood that determining B according to A does not mean that B is determined only according to A, and B can also be determined according to A and/or other information.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one monitoring unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A method for transmitting a power saving signal, comprising: sending, by a network device, a power saving signal to a terminal device, wherein the power saving signal comprises a first sequence, the first sequence is used to indicate at least part of identification information related to the terminal device, and/or the first sequence is used for the terminal device to perform time-frequency synchronization;

wherein the identification information related to the terminal device comprises: an identity of a device group which the terminal device belongs to, a device identity of the terminal device, and Physical Cell Identification (PCI) information of a cell where the terminal device resides;

wherein the power saving signal further comprises a first channel, and the first channel is used to indicate the identity of the device group which the terminal device belongs to or the device identity of the terminal device, or the power saving signal further comprises a second sequence, and the second sequence is used to indicate at least part of identification information related to the terminal device; wherein:

when one of the first sequence, the first channel, and a combination of the first sequence and the first channel are not used to indicate the identity of the device group which the terminal device belongs to or the device identity of the terminal device, the second sequence is used to indicate the identity of the device group which the terminal device belongs to or the device identity of the terminal device;

when the first sequence is not used to indicate the PCI information of the cell where the terminal device resides, the second sequence is used to indicate the PCI information of the cell where the terminal device resides; and when the first sequence is used to indicate a part of the PCI information of the cell where the terminal device resides, the second sequence is used to indicate the remaining part of the PCI information of the cell where the terminal device resides.

2. The method according to claim 1, wherein the first sequence is used to indicate the identity of the device group which the terminal device belongs to;

wherein there is a one-to-one correspondence between M different device groups and M first sequences, and the first sequence is a first sequence among the M first sequences which corresponds to the device group which the terminal device belongs to, and M is a positive integer.

3. The method according to claim 2, wherein cyclic shifts of the M first sequences are different, initial values of the M first sequences are different, scramble codes used for scrambling the M first sequences are different, positions of time domain resources for transmitting the M first sequences are different, or the M first sequences are M orthogonal sequences.

4. The method according to claim 1, wherein the first sequence is used to indicate the device identity of the terminal device;

wherein there is a one-to-one correspondence between N different device identities and N first sequences, and the first sequence is a first sequence among the N first sequences which corresponds to the device identity of the terminal device, and N is a positive integer.

5. The method according to claim 4, wherein cyclic shifts of the N first sequences are different, initial values of the N first sequences are different, scramble codes used for scrambling the N first sequences are different, positions of time domain resources for transmitting the N first sequences are different, or the N first sequences are N orthogonal sequences.

6. The method according to claim 1, wherein the first sequence is used to indicate the PCI information of the cell where the terminal device resides;

wherein there is a one-to-one correspondence between K PCI information and K first sequences, and the first sequence is a first sequence among the K first sequences which corresponds to the PCI information of the terminal device, and K is a positive integer.

7. The method according to claim 6, wherein cyclic shifts of the K first sequences are different, initial values of the K first sequences are different, scramble codes for scrambling the K first sequences are different, positions of the time domain resources for transmitting the K first sequences are different, or the K first sequences are K orthogonal sequences.

8. The method according to claim 1, wherein the first sequence is used to indicate the identity of the device group which the terminal device belongs to and the PCI information of the cell where the terminal device resides, wherein there is a one-to-one correspondence between M×K different identification information and M×K first sequences, and the first sequence is a first sequence among the M×K first sequences which corresponds to the identification information of the terminal device.

9. The method according to claim 8, wherein cyclic shifts of the M×K first sequences are different, initial values of the M×K first sequences are different, scramble codes used for scrambling the M×K first sequences are different, positions of time domain resources for transmitting the M×K first sequences are different, or the M×K first sequences are M×K orthogonal sequences.

10. The method according to claim 1, wherein the first sequence is used to indicate the device identity of the terminal device and PCI information of the cell where the terminal device resides;

wherein there is a one-to-one correspondence between N×K different identification information and N×K first sequences, and the first sequence is a first sequence among the N×K first sequences which corresponds to the identification information of the terminal device.

11. The method according to claim 10, wherein cyclic shifts of the N×K first sequences are different, initial values of the N×K first sequences are different, scramble codes used for scrambling the N×K first sequences are different, positions of time domain resources used for transmitting the N×K first sequences are different, or the N×K first sequences are N×K orthogonal sequences.

12. A method for transmitting a power saving signal, comprising: receiving, by a terminal device, a power saving signal sent from a network device, wherein the power saving signal comprises a first sequence, the first sequence is used to indicate at least part of identification information related to the terminal device, and/or the first sequence is used for the terminal device to perform time-frequency synchronization; and performing, by the terminal device, a power saving operation according to the power saving signal; wherein the identification information related to the terminal device comprises: an identity of a device group which the terminal device belongs to, a device identity of the terminal device, and Physical Cell Identification (PCI) information of a cell where the terminal device resides;

wherein the power saving signal further comprises a first channel, and the first channel is used to indicate the identity of the device group which the terminal device belongs to or the device identity of the terminal device, or the power saving signal further comprises a second sequence, and the second sequence is used to indicate at least part of identification information related to the terminal device; wherein:

when one of the first sequence, the first channel, and a combination of the first sequence and the first channel are not used to indicate the identity of the device group which the terminal device belongs to or the device identity of the terminal device, the second sequence is used to indicate the identity of the device group which the terminal device belongs to or the device identity of the terminal device;

when the first sequence is not used to indicate the PCI information of the cell where the terminal device resides, the second sequence is used to indicate the PCI information of the cell where the terminal device resides; and when the first sequence is used to indicate a part of the PCI information of the cell where the terminal device resides, the second sequence is used to indicate the remaining part of the PCI information of the cell where the terminal device resides.

13. The method according to claim 12, wherein the first sequence is used to indicate the identity of the device group which the terminal device belongs to;

wherein there is a one-to-one correspondence between M different device groups and M first sequences, and the first sequence is a first sequence among the M first sequences which corresponds to the device group which the terminal device belongs to, and M is a positive integer.

14. The method according to claim 13, wherein cyclic shifts of the M first sequences are different, initial values of the M first sequences are different, scramble codes used for scrambling the M first sequences are different, positions of time domain resources for transmitting the M first sequences are different, or the M first sequences are M orthogonal sequences.

15. A network device, comprising a processor, a transceiver, and a memory, wherein the processor is configured to execute instructions stored by the memory; wherein when the processor executes the instructions stored in the memory, the network device is caused to: generate a power saving signal, wherein the power saving signal comprises a first sequence, the first sequence is used to indicate at least part of identification information related to a terminal device, and/or the first sequence is used for the terminal device to perform time-frequency synchronization; and send the power saving signal to the terminal device; wherein the identification information related to the terminal device comprises: an identity of a device group which the terminal device belongs to, a device identity of the terminal device, and Physical Cell Identification (PCI) information of a cell where the terminal device resides;

wherein the power saving signal further comprises a first channel, and the first channel is used to indicate the identity of the device group which the terminal device belongs to or the device identity of the terminal device, or the power saving signal further comprises a second sequence, and the second sequence is used to indicate at least part of identification information related to the terminal device; wherein:

when one of the first sequence, the first channel, and a combination of the first sequence and the first channel are not used to indicate the identity of the device group which the terminal device belongs to or the device identity of the terminal device, the second sequence is used to indicate the identity of the device group which the terminal device belongs to or the device identity of the terminal device;

when the first sequence is not used to indicate the PCI information of the cell where the terminal device resides, the second sequence is used to indicate the PCI information of the cell where the terminal device resides; and when the first sequence is used to indicate a part of the PCI information of the cell where the terminal device resides, the second sequence is used to indicate the remaining part of the PCI information of the cell where the terminal device resides.

16. The network device according to claim 15, wherein:

when the first sequence is not used to indicate the identity of the device group which the terminal device belongs to or the device identity of the terminal device, the first channel is further used to indicate the identity of the device group which the terminal device belongs to or the device identity of the terminal device.

17. The network device according to claim 16, wherein the first channel is further used to indicate Bandwidth Part (BWP) information to be used by the terminal device and/or configuration information of Physical Downlink Control Channel (PDCCH) search space.

18. The network device according to claim 15, wherein the first sequence occupies a first time domain resource, the first channel occupies a second time domain resource, and the second time domain resource is located after the first time domain resource.

19. The network device according to claim 15, wherein the first sequence occupies a first frequency domain resource on the first time domain resource, and the first channel occupies the first frequency domain resource on the second time domain resource.

20. The network device according to claim 15, wherein the second sequence is a ZC sequence, an M sequence or a PN sequence.

21. The network device according to claim 15, wherein:

the first sequence occupies a first time domain resource, the first channel occupies a second time domain resource, a third time domain resource and a fourth time domain resource, and the second sequence occupies the third time domain resource; and the first time domain resource, the second time domain resource, the third time domain resource and the fourth time domain resource are sequentially arranged from front to back in a time domain.

22. A terminal device, comprising a processor, a transceiver, and a memory, wherein the processor is configured to execute instructions stored by the memory; wherein when the processor executes the instructions stored in the memory, the terminal device is caused to: receive a power saving signal sent from a network device, wherein the power saving signal comprises a first sequence, the first sequence is used to indicate at least part of identification information related to the terminal device, and/or the first sequence is used for the terminal device to perform time-frequency synchronization; and perform a power saving operation according to the power saving signal; wherein the identification information related to the terminal device comprises: an identity of a device group which the terminal device belongs to, a device identity of the terminal device, and Physical Cell Identification (PCI) information of a cell where the terminal device resides;

wherein the power saving signal further comprises a first channel, and the first channel is used to indicate the identity of the device group which the terminal device belongs to or the device identity of the terminal device, or the power saving signal further comprises a second sequence, and the second sequence is used to indicate at least part of identification information related to the terminal device, wherein:

when one of the first sequence, the first channel, and a combination of the first sequence and the first channel are not used to indicate the identity of the device group which the terminal device belongs to or the device identity of the terminal device, the second sequence is used to indicate the identity of the device group which the terminal device belongs to or the device identity of the terminal device, when the first sequence is not used to indicate the PCI information of the cell where the terminal device resides, the second sequence is used to indicate the PCI information of the cell where the terminal device resides, and when the first sequence is used to indicate a part of the PCI information of the cell where the terminal device resides, the second sequence is used to indicate the remaining part of the PCI information of the cell where the terminal device resides.

23. The terminal device according to claim 22, wherein when the first sequence is used to indicate the PCI information of the cell where the terminal device resides, the first sequence is further used for the terminal device to perform Radio Resource Management (RRM) measurement.

* * * * *